(12) United States Patent
Thomson et al.

(10) Patent No.: US 11,281,176 B2
(45) Date of Patent: *Mar. 22, 2022

(54) SURFACE DATA ACQUISITION, STORAGE, AND ASSESSMENT SYSTEM

(71) Applicant: EctoScan Systems, LLC, Cincinnati, OH (US)

(72) Inventors: Paul Thomson, Cincinnati, OH (US); Adam R. Gerlach, Oregonia, OH (US); Bruce Walker, Cincinnati, OH (US)

(73) Assignee: EctoScan Systems, LLC, Cincinnati, OH (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/417,902

(22) Filed: Jan. 27, 2017

(65) Prior Publication Data

US 2017/0227942 A1 Aug. 10, 2017

Related U.S. Application Data

(62) Division of application No. 13/373,456, filed on Nov. 15, 2011, now Pat. No. 9,599,461.

(60) Provisional application No. 61/458,023, filed on Nov. 16, 2010.

(51) Int. Cl.
| | |
|---|---|
| *G06T 7/00* | (2017.01) |
| *G05B 19/042* | (2006.01) |
| *G06T 7/73* | (2017.01) |
| *G01B 11/24* | (2006.01) |
| *G01B 21/20* | (2006.01) |

(52) U.S. Cl.
CPC .......... *G05B 19/0426* (2013.01); *G01B 11/24* (2013.01); *G01B 21/20* (2013.01); *G06T 7/00* (2013.01); *G06T 7/75* (2017.01); *G05B 2219/32217* (2013.01); *G06T 2207/30004* (2013.01)

(58) Field of Classification Search
USPC .................................. 700/95, 105; 706/919
See application file for complete search history.

(56) References Cited

U.S. PATENT DOCUMENTS

| | | | |
|---|---|---|---|
| 4,054,824 | A | 10/1977 | Nishioka |
| 4,275,741 | A | 6/1981 | Edrich |
| 4,445,516 | A | 5/1984 | Wollnik et al. |

(Continued)

FOREIGN PATENT DOCUMENTS

| | | |
|---|---|---|
| CN | 105750694 | 7/2016 |
| JP | H10111300 | 4/1998 |

(Continued)

OTHER PUBLICATIONS

"Retrieval by content similarity of 3D Models using spin images" Annales Des Télécommunications Dec. 2005, vol. 60, Issue 11-12, pp. 1360-1378 by Del Bimbo et al., (Year: 2005).*

(Continued)

*Primary Examiner* — Emilio J Saavedra
(74) *Attorney, Agent, or Firm* — Mark F. Smith; Smith Brandenburg Ltd

(57) ABSTRACT

A surface data acquisition, storage, and assessment system for detecting and quantifying similarities or differences between stored data and data collected from a scan. The system operates to scan features of an object and weighs various parameters and utilizing fuzzy logic makes a recommendation.

21 Claims, 32 Drawing Sheets

(56) References Cited

U.S. PATENT DOCUMENTS

| | | | |
|---|---|---|---|
| 4,530,367 | A | 7/1985 | Desjardins et al. |
| 4,755,952 | A | 7/1988 | Johns |
| 4,986,664 | A | 1/1991 | Iovoi |
| 5,311,109 | A | 5/1994 | Ozawa |
| 5,325,449 | A | 6/1994 | Burt et al. |
| 5,428,444 | A | 6/1995 | Haddock et al. |
| 5,941,833 | A | 8/1999 | Lipman |
| 6,057,925 | A | 5/2000 | Anthon |
| 6,484,047 | B1 | 11/2002 | Vilsmeier |
| 7,226,426 | B2 | 6/2007 | Thomson |
| 7,734,077 | B2 | 6/2010 | Hirsch et al. |
| 7,957,583 | B2 | 6/2011 | Boca et al. |
| 7,968,845 | B1 | 6/2011 | Wagner |
| 8,035,637 | B2 | 10/2011 | Kriveshko |
| 2002/0087274 | A1 | 7/2002 | Alexander et al. |
| 2002/0093115 | A1 | 7/2002 | Jang et al. |
| 2003/0013951 | A1* | 1/2003 | Stefanescu ........ G06F 17/30256 600/407 |
| 2003/0091226 | A1 | 5/2003 | Cahill et al. |
| 2004/0019269 | A1 | 1/2004 | Schaefer et al. |
| 2005/0041843 | A1* | 2/2005 | Sawyer ................ A61N 5/1049 382/128 |
| 2005/0245839 | A1 | 11/2005 | Stivoric |
| 2005/0238589 | A1 | 12/2005 | Houle et al. |
| 2006/0206027 | A1 | 9/2006 | Malone |
| 2008/0008401 | A1* | 1/2008 | Zhu .......................... A61B 5/05 382/294 |
| 2008/0118138 | A1* | 5/2008 | Zingaretti ............. G06T 7/0012 382/132 |
| 2008/0253612 | A1* | 10/2008 | Reyier .................. B25J 9/1697 382/103 |
| 2008/0260202 | A1* | 10/2008 | Roth ........................ G06K 9/32 382/100 |
| 2008/0262869 | A1 | 10/2008 | Bronn |
| 2008/0285831 | A1 | 11/2008 | Kirchberg et al. |
| 2009/0118600 | A1* | 5/2009 | Ortiz .................... A61B 5/0064 600/306 |
| 2009/0279672 | A1 | 11/2009 | Reiner |
| 2011/0082667 | A1 | 4/2011 | Ibarz et al. |
| 2011/0090343 | A1 | 4/2011 | Alt et al. |
| 2011/0150342 | A1* | 6/2011 | Franken ................ G06K 19/16 382/190 |
| 2011/0205354 | A1* | 8/2011 | Enomoto .......... H01L 21/67265 348/96 |
| 2015/0010128 | A1* | 1/2015 | Drouin ................. G01N 23/046 378/57 |
| 2016/0069743 | A1 | 3/2016 | McQuilkin et al. |

FOREIGN PATENT DOCUMENTS

| | | |
|---|---|---|
| WO | WO 02/095382 | 11/2002 |
| WO | WO 2012/051394 | 4/2012 |

OTHER PUBLICATIONS

"Spin-Images: A Representation for 3-D Surface Matching" Thesis, Carnegie Mellon University, Aug. 17, 1997, 304 Pgs., by Johnson (Year: 1997).*

Farrow, "Scanning Thermal Optical Measurement Platform for Ulcer Detection in High Risk Diabetic Patients" Rensselaer Polytechnic Institute, Thesis, 2008, 113 pages (Year: 2008).*

Radke et al., Images Changes Detection Algorithms: A Systematic Survey, IEEE Transactions on Image Processing, vol. 14 No. 3, Mar. 2005, pp. 294-307 (Year: 2005).*

Reiser et al., Medical Radiology: Screening and Preventative Diagnosis with Radiological Imaging, Springer, 2008, 353 Pgs. (Year: 2008).*

Del Bimbo et al., "Retrieval by Content Similarity of 3D Models Using Spin Images" Annales Des Telecommunications, Dec. 2005, vol. 60, Issue 11-12, pp. 1360-1378.

Huber, Automatic 3D Modelling Using Range Images Obtained from Unknown Viewpoints; IEEE Proceedings, 3rd International Conf. on 3D Imaging and Modeling, 2001, pp. 153-160.

Jurgen Assfalg et al., Content-Based Retrieval of 3D Objects Using Spin Image Signatures, Apr. 2007, pp. 589-599, vol. 9, No. 3, IEEE Transactions on Multimedia.

H. Quynh Dinh et al., "Multi-Resolution Spin-Images" 2006, Proceedings of the 2006 IEEE Computer Society Conference on Computer Vision and Pattern Recognition.

Berthold K. Horn, "Closed-Form Solution of Absolute Orientation Using Unit Quaternions" vol. 4, pp. 629- , Apr. 1987, Optical Society of America.

Andrew Edie Johnson, "Spin-Images; A Representation for 3D Surface Matching" Aug. 13, 1997, Carnegie Melton University.

International Search Report and Written Opinion for related application No. PCT/US11/01980 dated Apr. 4, 2012.

Furrow, Danies, "Scanning Thermal Optical Measurement Platform For Ulcer Detection In High Risk Diabetic Patients," Rensselare Polytechnic Institute, Troy NY, Aug. 2008.

* cited by examiner

TRAINING SECTION

FUZZY

TRIANGULAR POLYGONAL MESH WITH VERTEX SURFACE NORMALS

SPIN-IMAGE COORDINATES

SPIN-IMAGE GENERATION

SPIN-IMAGE SIGNATURES (a) POSITIVE CROWNS, (b) NEGATIVE CROWNS, and (c) SECTORS

FUZZY

GROUPING

SURFACE DATA ACQUISITION, STORAGE, AND ASSESSMENT SYSTEM

CROSS-REFERENCE TO RELATED APPLICATION

The present invention is a divisional patent application of U.S. Utility patent application Ser. No. 13/373,456 filed Nov. 15, 2011 entitled: Surface Data Acquisition, Storage, And Assessment System that relates to and claims benefit to U.S. Provisional Patent Application No. 61/458,023, filed Nov. 16, 2010, entitled: Spin-Image Pose For Computer Modeling.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records. The copyright owner, however, otherwise reserves all copyright rights whatsoever.

BACKGROUND OF THE INVENTION

The subject invention is a surface data acquisition, storage, and assessment system and more particularly a surface data acquisition, storage, and assessment system for detecting and quantifying similarities or differences between stored data and data collected from a scan.

There are many disparate fields in which human senses are used as measuring tools. These fields are often specialized, technical, or industrial, and yet workers in these areas still acquire and gauge data using one or more of their biological senses. For example, the farmer looks at and feels or squeezes produce to determine its ripeness, or a butcher views and presses on a cut of meat to determine its freshness. A geologist tries to identify a type of rock or soil by looking at its colors and by running his or her hands over it, feeling for surface roughness and grain size. During a delicate surgery, a pathologist receives a sample of tissue that must be identified rapidly using only what can be seen through a microscope. An art critic tries to authenticate a painting by looking at the brushstrokes and by feeling the surface texture. In the modern world of technology, even robotic devices depend on viewing and touching an object for identification, such as a robotic arm reaching into a box of assorted parts to identify and properly pick up a part for placement into a machine assembly. In each of these cases, the worker (human or machine) is using his/her/its senses to evaluate the external appearance or surface features of the object to detect and measure surface data, such as color, temperature, contour, shape, surface roughness or smoothness, and the like. Clearly, given the technical nature and great importance of many of these fields, a need exists for a system that can rapidly, accurately, precisely, and objectively acquire and measure surface data and automatically compare these data to a standard, should such a standard exist. If such a standard does not exist, then the creation of such a surface assessing system would greatly aid in its creation.

One process that can be utilized to acquire and measure surface data and compare these data to a standard is by pose estimation, particularly when the scan requires acquiring data of a three-dimensional ("3D") object. Pose estimation is a process that determines the position and orientation of known objects in 3D scenes relative to a remote observer. Humans perform pose estimation on a regular basis. Anytime somebody picks up a pencil or parallel parks an automobile they are using pose estimation to determine how to orient their hand properly to pick up the pencil or to initiate a trajectory that provides the best opportunity for parking successfully. In these two cases, the pose is determined using visual sensing, i.e. stereo vision and tactile feedback, but pose can be also derived from audio, radar, and other measurements that provide relative 3D position. Accordingly, pose estimation plays a significant role in a human's ability to interact with its environment, whether that environment is static or dynamic.

Pose estimation has been used in some computer vision applications for robotic or autonomous systems, where the system attempts to perform operations that are natural to humans. These applications include, but are not limited to, object identification, object tracking, path planning, and obstacle avoidance. Potential applications using pose estimation can be as simple as an industrial robotic system identifying a particular part from a bin of many different parts for picking up and loading into a machine, or as complex as autonomous aircraft flying in formation while navigating a terrain, or a spacecraft performing autonomous rendezvous and docking with a non-cooperative spacecraft by identifying docking features, developing an interception plan, and executing the plan. These applications however all require real-time pose estimation. Further, such systems for object pose estimation typically require that various landmarks or features (such as points, lines, corners, edges, shapes, and other geometrical shapes) must be identified and selected. A pose can then be made and registration performed using such identified references. Accordingly, such a system requires an object to have pre-identified features. Further, such methods often have difficulty with objects having same features but with different dimensions. Care must be taken in selecting such features as some objects may have the identified features but different non-identified features which could result in error.

Clearly, pose estimation can be applicable for certain robotic or autonomous systems, it also has other applications such as surface alignment. For example, surface alignment takes 3D surface measurements of multiple instances of the same object with different poses relative to the observer and applies a rigid transformation to the measurements so that each instance has the same pose relative to the observer. Surface alignment allows for automatic comparison such as defect detection in high production factory settings if one of the instances serves as a "truth" model. It also allows for the generation of complete 3D surface measurements of an object by stitching multiple 3D surface measurements from varying viewpoints. Varying viewpoints are required to generate a complete 3D surface measurement, because some regions of the surface are always occluded by others. With pose estimation, surface alignment can be performed with no knowledge of the relative pose of each surface as long as some overlap exists between the individual 3D surface measurements.

Systems have been developed for use in assessing medical conditions using various imaging systems. Systems for use in analyzing skin and joints have used baseline images for comparing with a current scan of the skin or joint. Such comparisons usually operate by the physician observing the scans. Other systems have been developed to automatically make comparisons of scanned images, the patients joint or body part being scanned are required to be immobilized using a specialized mold or jig in order to ensure proper alignment of the images for registering points on the images for making proper comparisons. Such immobilization is difficult for certain body regions and makes scanning problematic if such scans are being done at different locations. Further, the patients may require different methods for immobilization making the process more complex, time consuming, and expensive. While it may be possible to automatically make comparisons of scanned images of a patient, such systems require precise positioning of the patients joint or scanned area which again is time relatively complex, consuming and expensive. Further, such systems often require that the scanner making the scan must be consistently aligned with and/or consistently positioned relative to the surface being scanned. Other systems have been developed that require the physician to make artificial references on the surface of the patient being scanned for registering to allow for the proper alignment of the images.

Many pose estimation algorithms exist in literature, but it has now been found that the spin-image pose estimation algorithm provides the most accurate results while being robust to sensor noise and placing no surface restrictions on the object of interest other than it must be pose distinct (i.e. unlike a sphere). It also places no restrictions on the measurement technology other than it must generate a 3D surface mesh. Although the spin-image algorithm is accurate, like other robust pose estimation algorithms, the algorithm is computationally complex and the time required to compute a pose estimate is relatively long. Unfortunately, the relatively long computational time makes it inadequate for the many engineering applications that require a robust real-time pose estimation algorithm.

The fundamental principal behind a spin-image algorithm is to provide an efficient method for representing and matching individual points of an object's surface. It should be understood that by comparing and matching spin-images one is actually comparing and matching surface points. This representation is called a spin-image. By matching the spin-images of surface points in an observed scene (scanned image) to the spin-images of surface point of the "truth" model (reference image), surface point correspondences can be established. It should be understood that the truth model can be a scan, CAD model, mathematically defined surface, and the like. This matching procedure requires that each scene spin-image be compared to all reference spin-images by determining the linear correlation between the spin-images called the similarity measure. This is one of the most time-consuming portions of the algorithm and until now makes the spin-image pose estimation algorithm impractical for many applications. For an example, a typical spin-image is a 16×16 pixel image. Therefore, the spin-image is represented by an array of 256 numbers or "counts" at each of the 256 squares forming a grid over the image. To check for matches of spin-images, the 256 numbers in the spin-image for each point in the scene image must be compared to the 256 numbers in each reference spin-image. If the 3D scene image consists of a million points, and the reference spin-image also contains a million points, therefore there are a million of these 256 comparisons that must be made (256 million comparisons to check if the spin-image for one point in the scene spin-image matches the spin-image for one of the points in the reference spin-image). If multiple scene image points are to be compared to the full set of reference spin-image points, then the number of comparisons must be multiplied by the number of scene spin-image points to be matched. Therefore, spin-images with a larger number of grid squares (such as 32×32) results in even more computations to compare spin-images. Unfortunately, as a result of such a large number of comparisons that must be made, this method of using spin-image comparisons cannot be used for real-time pose estimation and is therefore not practicable for many applications.

In view of the foregoing, it is apparent that a need exists for a surface data acquisition, storage, and assessment system for detecting and quantifying similarities or differences between collected data obtained from the object of interest and stored data and which can operate in a relative short amount of time and preferably in relative real time. Accordingly, a need also exists for a method or process that decreases the time required for calculating a pose estimate such as by the use of a spin-image algorithm, thus increasing its performance thereby making it more practical for many applications that require real-time operations. Further, a need exists for a system that allows objects to be scanned without the need for the object to be immobilized with a specialized mode or jig when scanned or the scanner to be in the same position relative to the object for each scan, thus placing no restrictions of how the object being scanned is positioned relative to the scanner.

SUMMARY OF THE INVENTION

The subject invention is a surface data acquisition, storage, and assessment system for detecting and quantifying similarities or differences between collected data obtained from a scanned object and stored data. In a preferred embodiment of the invention the system comprises one or more sensing components for scanning and measuring various surface features of an object. Such features include the color, temperature, texture, size, shape, spatial dimensions, contour, curvature, softness, roughness, shininess/gloss, infrared signature, electrical vectors/flux, magnetic field strength/vector/flux, dynamic rebound, spatial phase characteristics, measurements derived from spatial phase characteristics, flexibility, and other such features. The system further comprises a data analysis software module having software and/or firmware capable of comparing data retrieved from the object scanned to a database or other representation comprising data from other similar or dissimilar objects or from a previous scan of the object.

In a preferred embodiment of the invention the system and method operates by describing a 3D surface with a collection of 2D images (spin-images). The system operates such that the spin-images are represented by a substantial reduction of numbers (256 pixels are generally represented by less than 10 numbers) thus allowing for substantially quicker pose estimations. When two spin-images are compared a similarity measure (score) is generated that indicates their similarity such that the higher the score the more similar are the images. Unlike traditional methods that treat all matches equally, the subject process examines all matches based on the similarity measure and groups them using the score. The process uses the match with the highest score, creates a group and then estimates a pose. If the pose error is less than the error threshold, the process ends and the pose is estimated. If the pose error is greater than the error threshold, the process uses the match with the next highest similarity measure and repeats the process until it obtains a pose error that is less than the threshold. This process significantly increases the speed of the process such that real time comparisons can be made.

In another preferred embodiment of the invention the data analysis software module operates to detect and quantify the similarities or differences between collected data taken of the scanned object and stored (reference) data.

In another preferred embodiment of the invention the data analysis software module operates to determine the identity of the scanned object by comparing the data from scanned object to various stored (reference) data.

In another preferred embodiment of the invention the data analysis software module operates to determine differences and similarities between data obtained from two or more scans of the object in real time.

In a preferred embodiment of the invention the data analysis software module comprises computing hardware such as one or more apparatus consisting of central processing units (CPU's), graphics processing units (GPU's), digital signal processors (DSP's), microprocessors, field programmable gate arrays (FPGA's), very large scale integration (VLSI) systems, complex programmable logic devices (CPLD's), or systems on a chip (SOC's), and/or other such data processing devices including cell processors, biological processors, and quantum computing.

In another preferred embodiment of the invention the data analysis software module is capable of comparing the data retrieved from the scanned object to a database or other representation comprising data from other similar or dissimilar objects (reference data).

In another preferred embodiment of the invention, the data analysis software module is capable of detecting and quantifying the similarities or differences between collected data from the scanned object (scanned data) and stored data (reference data).

In another preferred embodiment of the invention, the data analysis software module operates to determine the identity of the scanned object by comparing the data from the scanned object (scanned data) to various stored data (reference data).

In a preferred embodiment of the invention the data analysis software module performs a method of representing the local topography of the object as a 2D histogram that is invariant to rigid transformations and creates model spin-images for the generation of plausible scanned model point correspondence for use to generate pose estimates.

In a preferred embodiment of the invention, the surface data acquisition, storage, and assessment system operates to scan a mechanical object.

In a preferred embodiment of the invention, the surface data acquisition, storage, and assessment system operates to scan a biological object.

In a preferred embodiment of the invention, the surface data acquisition, storage, and assessment system operates to scan a medical condition.

In a preferred embodiment of the invention, the surface data acquisition, storage, and assessment system operates to scan an artifact.

In a preferred embodiment of the invention, the surface data acquisition, storage, and assessment system operates to scan a geographical object.

In a preferred embodiment of the invention, the surface data acquisition, storage, and assessment system operates to scan an agricultural object.

In a preferred embodiment of the invention, the surface data acquisition, storage, and assessment system operates in conjunction with robotic manufacturing systems.

In a preferred embodiment of the invention, the surface data acquisition, storage, and assessment system operates in conjunction with robotic surgical systems.

Other advantages, objects, and embodiments of the invention will be apparent from the following description, the accompanying drawings and the appended claims.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
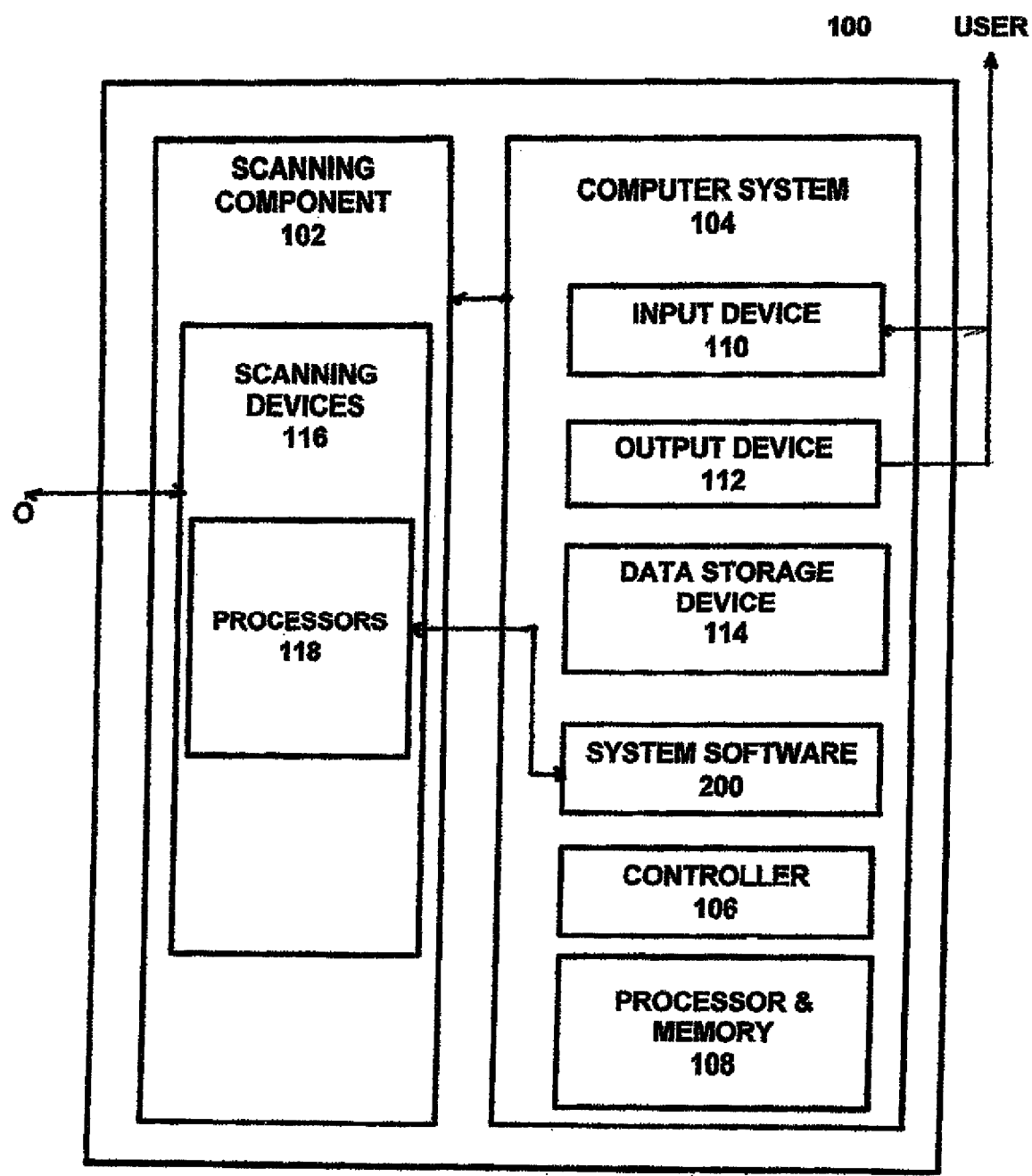
FIG. 1 is a schematic representation of a preferred embodiment of the a surface data acquisition, storage, and assessment system for detecting and quantifying similarities or differences between collected data obtained from the scanned object and stored data (reference data) showing a scanning component having one or more scanning devices and a computer system having at least one data storage device and system software.

Referring to FIG. 1, the surface data acquisition, storage, and assessment system 100 comprises a scanning component 102 and a computer system 104 for implementing and operating the system software 200 that performs the method of the subject invention. The computer system 104 includes a controller 106, a processor and a memory 108. It should be understood that the processor and memory 108 operates to perform the specific data analysis function as described herein and can comprise various computing hardware such as central processing units (CPU's), graphics processing units (GPU's), digital signal processors (DSP's), microprocessors, field programmable gate arrays (FPGA's), very large scale integration (VLSI) systems, complex programmable logic devices (CPLD's), or systems on a chip (SOC's), and/or other such data processing devices including cell processors, biological processors, and quantum computing devices. The computer system 104 further comprises other devices, such as a suitable input device, like a keypad, touch screen, or any other suitable input device 110 that can accept information; one or more suitable output devices 112, such as a computer display, printer, image-forming or display device, and the like; and a data storage device 114 such as any of the usual devices used for the storage of data, such as computer hard drives, floppy discs, binary codes, optical bits, mechanical scribes, magnetic tapes, compact discs, digital audio tapes, analog tapes, vinyl discs, and any device or devices capable of storing data. It should be understood that the computer system 104 can include any combination of the above components, or any number of different components, peripherals, and other devices. Preferably, the computer system 104 operates under the control of an operating system, such as the WINDOWS operating system developed by Microsoft Corporation or the MACINTOSH operating system developed by Apple Computer Corporation. It should be understood, however, that other operating systems could be utilized to implement the system software 200 of the surface data acquisition, storage, and assessment system 100 of the present invention.

Figure 2:
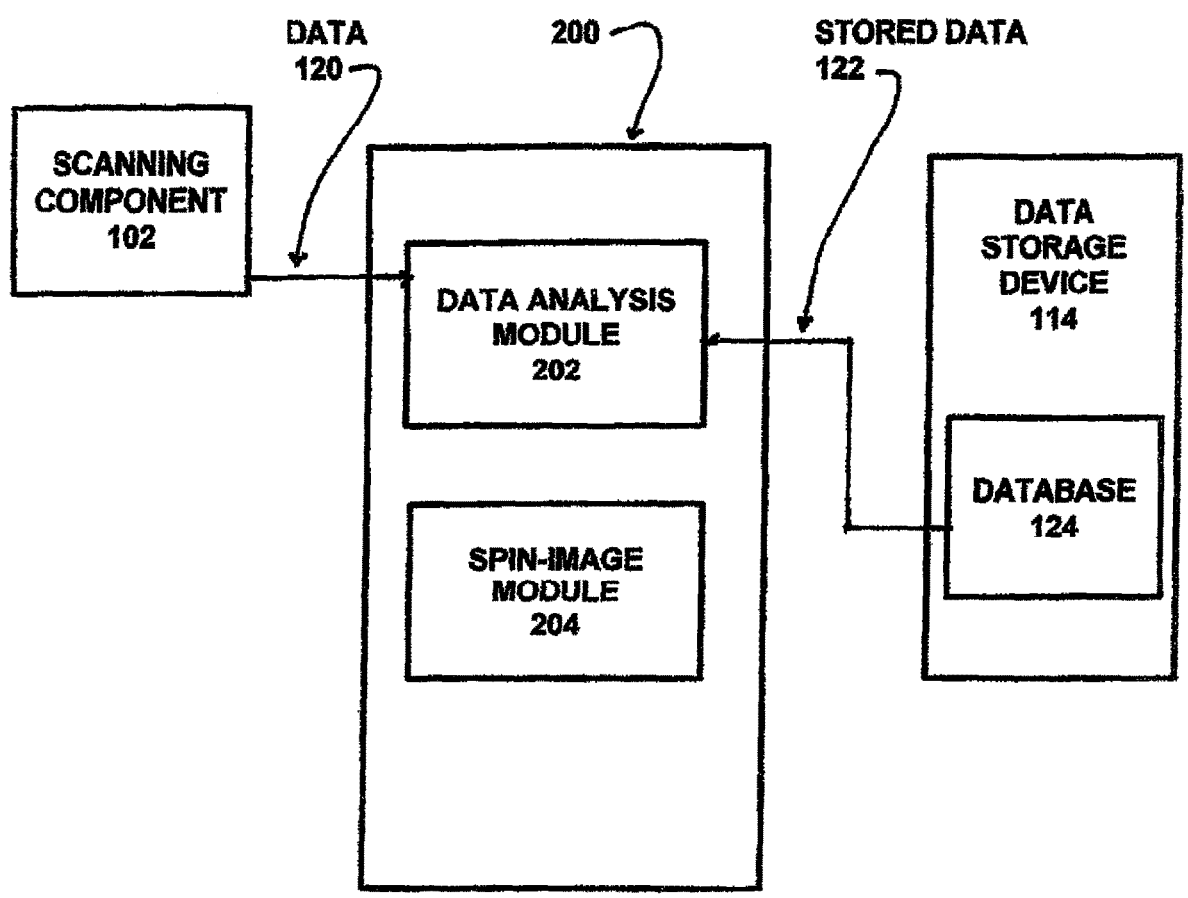
FIG. 2 is a schematic representation illustrating the general methodology of a preferred embodiment of the system software of FIG. 1 showing a data analysis module and a spin-image module.

Preferably, as shown in FIG. 2, the scanning component 102 includes one or more scanning devices 116 that operate to scan and/or measure various features of an object O. Such features include, but are not limited to, color, temperature, texture, size, shape, spatial dimensions, contour, curvature, softness, roughness, shininess/gloss, infrared signature, electrical vectors/flux, magnetic field strength/vector/flux, dynamic rebound, flexibility, special phase characteristics, measurements derived from spatial phase characteristics, and other like features. The scanning devices 116 preferably comprise conventional scanning devices that have the capability to capture electromagnetic radiation from any part of the electromagnetic spectrum, and include, but not limited to visible light cameras, infrared cameras or detectors, ultraviolet cameras or detectors, x-ray or high-energy detectors, radio wave detectors, microwave detectors, structured light detectors, glossmeters, colorimeters, radiation dosimeters or reflectometers. The scanning devices 116 may also include microphones or other sound capturing devices, mechanical devices such as calipers or sensing wires or probes, laser distance or contour measuring devices, strain gauges or the like. It should be apparent to one skilled in the art that the scanning component 102 can comprise any scanning device 116 capable of detecting and/or measuring surface data of an object or any device capable of detecting or measuring data transmitted through the surface of an object. The scanning component 102 further includes one or more processors 118 which are coupled to the system software 200 of the computer system 104 such as by electrical wires or other electrically conducting fibers or circuits, optical fibers, or any other wired or wireless data connection capable of transmitting data, sound waves, or images, including Internet connections, local area networks (LAN) connections, wide area networks (WAN) connections, which operate together to direct the operation of the scanning devices 116.

Referring to FIGS. 1 and 2, the computer system software 200 is shown having a data analysis software (and/or firmware) module 202 which operates, as described below, to compare collected data 120 retrieved from the scanned object O to reference data 122 stored in database 124 within the data storage device 114 which can include a representation comprising data from other similar or dissimilar objects. In a preferred embodiment, the data analysis software module 202 operates to determine the identity of the scanned object O by comparing the collected data 120 to various stored reference data 122. It should now be apparent to one skilled in the art that data analysis software module 202 can include various information mechanisms capable of performing the wide range of data analysis enabled by the usual range of available computer programs. It should also now be apparent to those skilled in the art that the surface data acquisition, storage, and assessment system 100 may comprise a variety of scanners or detectors and databases and may be used for various purposes as will be described more fully herein.

Referring to FIGS. 1 and 2, the operating components of the surface data acquisition, storage, and assessment system 100 and the system software 200 is shown whereby the computer system 104 is in communication with the scanning component 102 such that instructions can be inputted into the system 100 using the suitable input device 110 to cause the system software 200 to direct the operation of one or more of the scanning devices 116. Preferably, the system software 200 is also an interactive, menu and event driven system using conventional type of prompt, dialog, and entry windows to guide a user to enter information and instructions to provide an interactive communications interface between the system 100 and the users. As used herein, the term "software" refers to any form of programmed machine-readable language or instructions (e.g., object code) that, when loaded or otherwise installed, provides operating instructions to a machine capable of reading those instructions, such as a computer. The system software 200 of the present invention preferably can be stored or reside on, as well as be loaded or installed from, one or more floppy disks, CD ROM disks, hard disks or any other form of suitable non-volatile electronic storage media or can be run from a remote location such as a "cloud" or Internet site. The system software 200 can also be installed by downloading or other form of remote transmission, such as by using Local or Wide Area Network (LAN or WAN)-based, Internet-based, web-based or other remote downloading or transmission methods.

Figure 3:
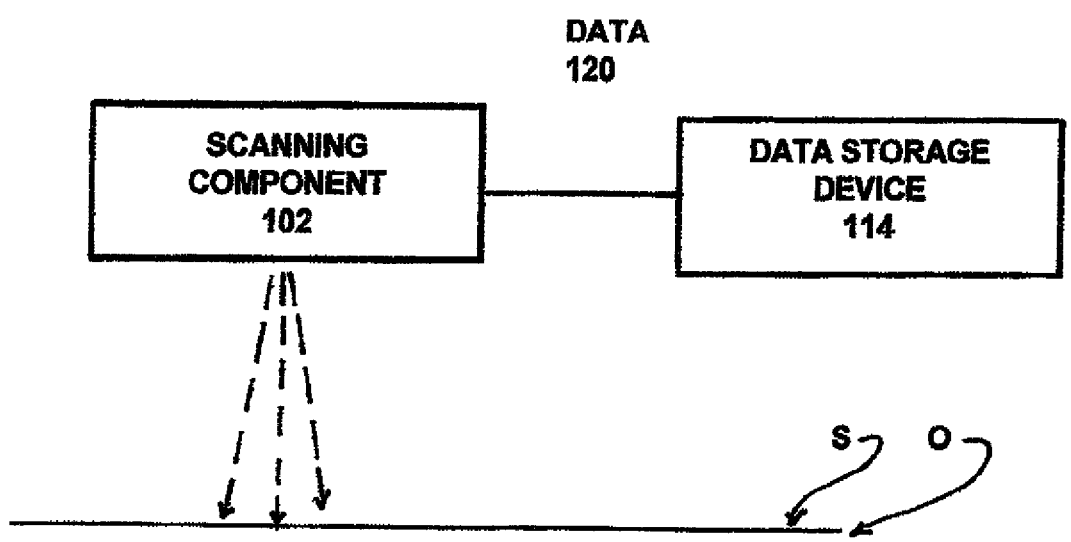
FIG. 3 is a schematic representation illustrating the general methodology showing the scanning component obtaining a scan of the surface of an object and storing the scanned information in the data storage device.

Illustrative Examples of Use:

An illustrative example of a preferred embodiment of the surface data acquisition, storage, and assessment system 100 of the subject invention is shown in FIG. 3 wherein the scanning component 102 is a visible light camera capable of detecting shape or form, and a color-detecting device, such as a colorimeter. The system 100 as used herein operates to scan the surface S of an object O. In one illustrative example the object is a painting which is scanned to quantify the painter's brushstrokes and use of color. These collected data 120 are then transmitted to data storage device 114 for future processing by the system software 200 and/or transmitted to the data analysis module 202 of the system software 200. For one illustrated example, database 124 includes for example stored reference data 122 of the brushstrokes and color palettes of all known painters. It should now be apparent to one skilled in the art that the database 124 can also comprise stored reference data 122 containing a library of standard elements, such as for example artistic elements of length or shape of brushstroke, implement used to apply pigment, medium, subject matter, and so on. In the illustrated example, after the collected data 120 is obtained, the data analysis module 202 of the system software 200 causes the data analysis module 202 to operate and use the collected scanned data 120 to make a determination such as the likely identity of the painter who painted the painting.

It should be now be apparent to one skilled in the art that the system 100 could be used for similar operations such as, but not limited to, identifying and/or grading coins (via the coins' colors, luster, shininess, and physical form), to authenticate other artwork, such as sculpture, via surface data collection on carving, color, and/or materials used, for object recognition, surface analysis, medical analysis, manufacturing analysis, product review, and other similar uses that can benefit from comparing a scanned object with a set of reference data.

In other preferred embodiments, the system 100 is used by earth scientists to identify and/or analyze rocks, minerals, soils, and other materials. Here, the scanning component 102 is a three-dimensional scanning device 116; such as structured light or laser, that detects and measures the object's clast or particle sizes and ratios; and/or a color detector (such as a color camera) to detect and measure the object's color; and/or an ultraviolet light detector to detect and measure the object's ultraviolet reflections, absorptions, or emissions; and/or a thermo detector (such as a thermo camera or laser) to measure temperature at various locations along an object. The collected scanned data 120 is then transmitted to the data storage device 114 for use by the data analysis module 202 of the system software 200. In a preferred embodiment the database 124 includes stored reference data 122 such as the various characteristics of rocks, minerals, and soils, thus allowing comparisons to be made between the collected scanned data 120 and that of known samples stored in the database 124, allowing the data analysis module 202 to operate to make a determination/identification of the object. It should now be apparent to one skilled in the art that the stored reference data 122 can be a library of standard geological elements, such as clast size, luster, color, cleavage, other crystallographic indices, chemical composition, and so on.

Figure 4:
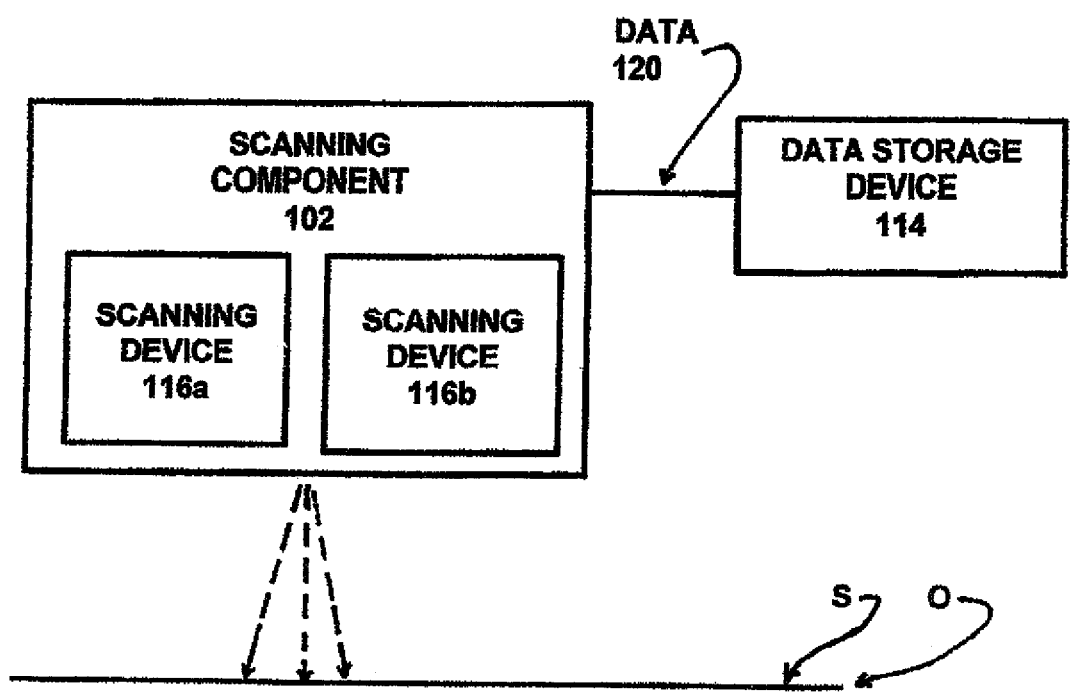
FIG. 4 is a schematic representation illustrating the general methodology of the scanning component having at least one scanning device performing a scan of the surface of an object and storing the scanned information (data) in the data storage device.

In another illustrative example as shown in FIG. 4, the surface acquisition, storage, and assessment system 100 is used by paleontologists. In this illustrative example, the scanning component 102 comprises multiple scanning devices 116 such as a three-dimensional surface scanning device 116a and a color-detecting device 116b, which cooperate together to scan the surface of objects O, such as a fossil. The data analysis module 202 can then operate to determine various aspects of the object, such as species definition and/or the identity of the object by comparing collected scanned data 120 with stored reference data 122, such as that of known specimens. It should now be apparent to one skilled in the art that by these means, users, such as scientists, can create a mathematical definition of species, based on their surface scanned data, such as the width, length, or height or color of various specimens. It should also now be apparent to one skilled in the art that both living and fossilized biological specimens could be analyzed by these means.

It should now be understood that the above examples are illustrative of the numerous applications of the surface data acquisition, storage, and assessment system 100 and many other applications can now be readily realized by those skilled in the art. For example, the scanning component 102 can comprise one or more various scanning devices 116 such as a three-dimensional scanning device, such as a laser; and a color-detecting device, such as a color camera; and a thermo imaging system, such as a thermo camera or laser. The database 124 can include various stored reference data 122 such as shapes, contours, translations, orientations, scale, colors, and temperatures of various parts of objects. The system 100 can then be used in various applications to identify, locate, pick up, and place such parts into an assembly, compare objects, compare various aspects of an object with desired manufacturing or operating ranges, perform inspections, perform studies, and various other applications that should now be apparent to one skilled in the art. Accordingly, for example, a scan of an object, such as in a manufacturing operation or a testing operation, an object can be scanned and the various parameters comprising the collected data can be compared with reference data and analyzed for defects, such as hot spots, dimensions, colors, etc. that are outside allowable tolerances.

Data Analysis Software

The data analysis module 202 of the system software 200 operates by utilizing fuzzy logic and weighted parameters to determine and make recommendations or provide the necessary instructions, for various applications such as described above. For an illustrative example of the fuzzy logic of the system software 200, one weighted parameter could include size or dimensions of an object, such as for a medical condition like a mole or rash which is used herein as an illustrative example, it could be decided that larger the object the worse the prognosis. For example, it could be decided that: 1 mm diameter=5% chance of malignancy, 2 mm=10% chance, 3 mm=30% chance, 4 mm=70% chance, and 5 mm=90% chance. For shape, an all smooth border=5% chance, 10% of total border is irregular=10% chance, 25% of border is irregular=30% chance, 50% irregular=70% chance, 75% irregular=90% chance, and 100% irregular=99% chance of malignancy. Another weighted parameter could be color, whereby all uniformly same as patient's uninvolved skin color=5% chance of malignancy, any nonuniformity of color, but no red or blue=10% chance, any red color=30% chance, any blue color=80% chance, and variegation (mixed reds and blues)=throughout and another weighted parameter could be temperature whereby reference skin temperature=5% chance of malignancy, any area of mole with temperature>0.2 degree F. above reference temperature=30% chance, temperature>0.4 degrees=50% chance, >0.6 degrees=80% chance, >0.8 degrees=90% chance, and >1.0 degrees=95% chance of malignancy. It should now be apparent to one skilled in the art that such determination can be placed into fuzzy sets based on the known parameters as stored reference data 122 in the database 124 of the data storage device 114. The data analysis module 202 then operates to compute and display a recommendation based on the collected scanned data 120 in accordance with the weighted parameters and the sets of stored reference data 122.

In another illustrative example, moles using the scanning component of the subject invention have been scanned for measurement of size, shape, color and temperature. It should be noted that for this example weighted parameters could include the larger the size, the more irregular the border, the redder, bluer, or more non-uniform the color, and the warmer (relative to the skin reference temperature), the greater the suspicion that the mole is malignant, i.e., a melanoma. The system software 200 operates that for each case "yes/no" cutoffs are created for each of the above weighted parameters ("yes" is considered suspicious for malignancy, "no" is considered not as suspicious). Further, for this example weighted parameters can be determined such that: for size, greater than 4 mm. diameter is considered to be suspicious; for shape, any border irregularity (means border is not a smooth, continuous curve) is considered to be suspicious; for color, any red, blue, or variegated color is considered to be suspicious; and for temperature, any temperature greater than reference temperature is considered to be suspicious, according such determinations result in one of the following 16 outcomes (+ is considered to be suspicious, − is considered to be not suspicious outcome of scan for that parameter):

| Scenario | Size | Shape | Color | Temp. |
|---|---|---|---|---|
| 1 | − | − | − | − |
| 2 | + | − | − | − |
| 3 | − | + | − | − |
| 4 | − | − | + | − |
| 5 | − | − | − | + |
| 6 | + | + | − | − |
| 7 | + | − | + | − |
| 8 | + | − | − | + |
| 9 | − | + | + | − |
| 10 | − | + | − | + |
| 11 | − | − | + | + |
| 12 | + | + | + | − |
| 13 | + | − | + | + |
| 14 | + | + | − | + |
| 15 | − | + | + | + |
| 16 | + | + | + | + |

In general, outcomes 1 through 3 would result with the data analysis module operating to determine and display a recommendation, such as on the output device of the computer system, to "not biopsy", while outcomes 4 through 16 would result in the data analysis module operating to determine and display the recommendation "biopsy or remove." Accordingly, unlike systems that only compares an image of a scanned mole to stored reference images of actual moles, the subject invention operates to compare measurements of scanned mole to a set of fixed parameters that may be weighted and calculates a recommendation based on such fixed parameters.

To further understand the operation of the data analysis module and the fuzzy logic utilized, the following exemplary illustration is provided. In a preferred embodiment of the invention, the surface acquisition, storage, and assessment system 100 operates, such as shown in FIG. 4, whereby the scanning component 102 includes scanning devices 116a and 116b effective for collecting the following scanned collected data 120 and saves the scanned collected data 120 into the data storage device 114:

Diameter—Measured as the largest distance between two points on the border of the mole.

Shape—A normalized measure of the regularity of the mole boarder. 0 indicates a smooth mole boarder like a circle, while 1 indicates a mole boarder that is highly irregular or rough.

Redness—A normalized measure of the average red color content of the mole. 1 indicates Red, while 0 indicates the presence of no red color content.

Blueness—A normalized measure of the average blue color content of the mole. 1 indicates Blue, while 0 indicates the presence of no blue color content.

Variegation—A normalized measure of the color consistency of the mole. 0 indicates a consistent color profile for the whole mole, while 1 indicates high variation in the color content about the surface of the mole.

Temperature—Measured as the average temperature of the mole relative to the normal skin temperature.

The data analysis module 202 of the surface acquisition, storage, and assessment system 100 used the scanned collected data 120 that has been weighted with stored reference data 122 and generates a display of a recommendation showing the type of intervention that should be applied as well as a confidence factor in accordance with the weighted parameters to be included in that recommendation. In this example, the possible interventions are to "Do Nothing," "Biopsy," or "Exsize."

In another exemplary illustration the surface data acquisition, storage, and assessment system 100 is used for surface analysis or manufacturing analysis (for example for bridge evaluation to quantify the danger associated with present cracks). The system 100 operates such that the scanning component 102 having various scanning devices 116 functions by scanning surface cracks and cooperates with the data analysis module 202 that uses collected data 120 with stored reference data 122 functions to determine:

Length—A normalized measure of the total length of all cracks present in a given image. This is normalized by the maximum dimension of that particular object being imaged. 0 indicates no crack, while 1 indicates a crack spanning the object.

Depth—A normalized measure of the maximum depth of all the cracks present in a given image. This is normalized by the dimension of that particular object being imaged in the direction of the crack depth propagation. 0 indicates no crack, while 1 indicates a crack penetrating through the object.

Branching—A normalized measure of the number of cracks stemming from other cracks. 0 indicates no branches, while 1 indicates a significant number of branches.

The data is then used by the data analysis module 202 to generate an output that is a normalized measure of the potential risk of failure due to cracking where "0" indicates no risk, while "1" indicates extremely high likelihood of failure. In a preferred embodiment, the data analysis module 202 further operates to create recommendations on the action that should be taken in view of the scans and the weighted parameters with regards to repairing or replace the affected structure. For this illustrative example, the scanned collected data 120 can be compared with stored reference data 122 in the database 124, and using fuzzy logic as described above analyzed to determine the safety of the structure, such as the bridge. In this illustrative example the output of the system 100 is a decision in the type of action that should be applied: "do nothing," "repair," or "replace."

It should be readily apparent to one skilled in the art that the system of present invention can be configured to operate in conjunction with various devices and apparatus, and for use in many applications. Further, it should be understood that the weighted parameters are given weights based on the significance of the parameter in relation to object and condition being assessed. Table 1 provides a listing of additional applications of the invention. It should be understood however that the various apparatus and applications contained herein is for illustrative purposes and it should be understood that the systems and methods of the subject invention are not limited to the provided examples and listings.

TABLE 1

Various Applications of the Invention.

| Object of Interest | Scanning device 116 | Application/Utility of Invention |
|---|---|---|
| Metals/concrete/roads microfractures/failure | 3D/x-ray imager/color/thermal | Detect |
| Surfaces that form via curing/surface curing/drying/solidifying/annealing | 3D imager/color/thermal | Detect/measure smoothness/defects |
| Tires wear | 3D imager/thermal/dynamic rebound | Detect cracks/leaks/abnl. |
| Tools/gears cracks/defects/failure | 3D/x-ray imager/thermal/color | Detect |
| Cutting implements sharpness/cracks | 3D/x-ray imager/thermal/color | Detect/measure |
| Growing objects, e.g. biological/crystals | 3D imager/color/thermal | Measure rate of growth |
| Cosmetics | 3D imager/color/thermal | Measure coverage/blending |
| Electrical circuits | 3D imager/thernial/magnetic | Detect circuit defects/shorts |
| Welds/solders/brazes defects | 3D/x-ray imager/thermal/color | Detect weld/solder/braze |
| Foodstuffs | 3D imager/color/thermal | Detect spoilage/ripeness |
| Animals disease | 3D imager/color/thermal | Veterinary detection of |
| Gemstones gemstones | 3D/x-ray imager/color/thermal | Identify/authenticate |
| Cell/tissue cultures | 3D imager/color/thermal | Identify cultured material |
| Pathological specimens | 3D/x-ray imager/color/thermal | Identify/classify specimen |
| Normal biological tissue | 3D/x-ray imager/color/thermal | Screening for normalcy |
| Fabrics/textiles defects | 3D scanning/color/thermal | Detect/measure fabric |
| Sanitary surfaces contaminants/germs | 3D scanning/color/thermal | Detect |

It should also be understood that the system is not limited to fuzzy logic systems but that other logic systems such as Bayesian logic, artificial neural networks, and other like systems can also be used.

In another preferred embodiment of the invention the surface data acquisition, storage, and assessment system 100 of the subject invention operates by performing two or more scans of an object and comparing the scan images to determine changes in the object that occurred during the period between the scans. In another preferred embodiment, the subject invention operates by performing at least one scan of an object and a scan of a model or another object and determines changes between the two.

Spin-Image Matching

One difficulty in comparing images from two or more scans taken over a period of time using conventional computer processing is the need to ensure that common points on the two images are properly aligned. One method for properly aligning scans is by use of a process utilizing spin-images. Spin-images are generated to provide a simple representation that can be used to compare the spin-images from different points on two representations of an object to see whether they have similar spin-images. If they do, this implies the representations correspond to the same surface point. Spin-image matching is the process of determining the similarity of a scene spin-image to those in a spin-image stack (database) created from a reference model or image of that object. Due to noise, lighting, and other effects, spin-images from different instances of an object will never be exactly the same. Therefore, a meaningful way of comparing two images is required. Further, in for many applications, comparing images must be done in real-time, thus, comparing images must be done in a manner to allow for real-time comparisons. In addition, such comparisons must be made at various locations that do not permit the use of expensive, room-sized specialized computer systems.

Figure 7:
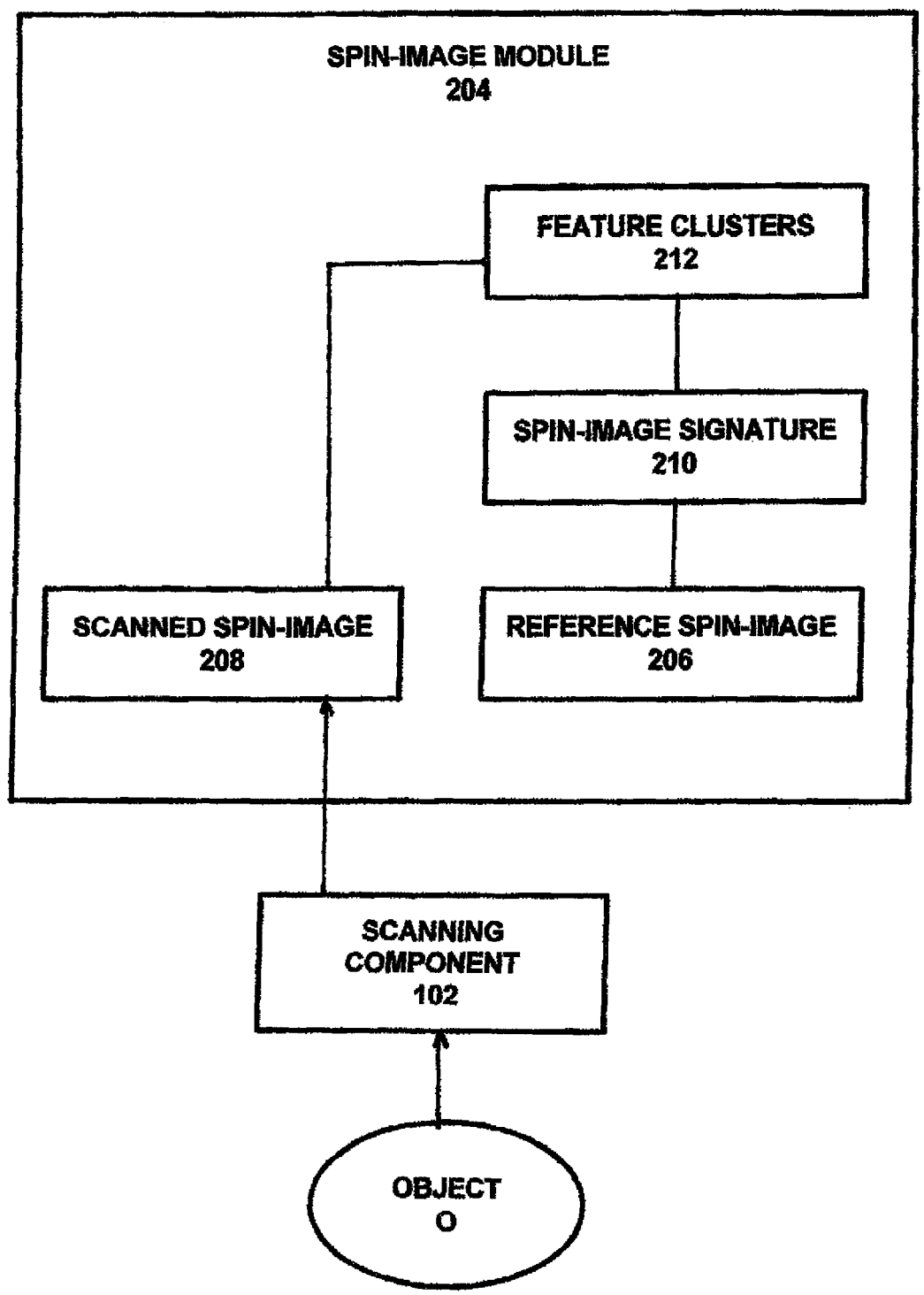
FIG. 7 is a schematic representation illustrating the general methodology of the spin-image module of the system software.

Data Analysis Software Module (Superimposing Scan Images):

Referring to FIGS. 2 and 7, in a preferred embodiment of the invention, the system software 200 preferably comprises a spin-image module 204 for providing an efficient method of representing and matching individual points of an object's surface S necessary for comparing two or more scene (scanned) images. In order to parallelize the matching portion of the spin-image module 204 enough to approach real-time performance needed for many applications, while not requiring room sized, power hungry computer systems, the processor and memory 108 of the computer system 104 preferably is a graphics processing unit (GPU) for a parallel implementation of the matching portion of the spin-image module 204. In a preferred embodiment of the invention the GPU has a massively parallel, many-core computing architecture that provides teraflop computing power in a scalable, portable, power efficient, and affordable platform. One illustrative example of such a GPU is sold by Nvidia Corporation of Santa Clare, Calif.

In another preferred embodiment of the invention the spin-image module 204 operates such that the matching operation restricts reference spin-images 206 (obtained from previous scans of an object) by comparing only those most likely to match the scene spin-image 208 (obtained from a scan of an object that is being compared to reference spin-images). The spin-image module 204 operates by using a spin-image signature 210 (reduced-order representation of a spin-image) to identify feature clusters 212 in the set of reference spin-images 206. The spin-image module 204 further operates to find the degrees of membership of a scene (scanned) spin-image 208 to the clusters 212 of the set of reference spin-images 206. The reference spin-images 206 are then filtered by comparing the reference spin-images 206 and determining the degrees of membership similar to that of the scene (scanned) spin-image of interest 208. A similarity measure is than determined and grouped in accordance with the similarity measure and checked to ensure that the two images are geometrically consistent and then a pose is estimated. As used here the following definitions apply:

c*-Image: is a reduced order representation of a spin-image described by the degree of membership of that spin-image to each fuzzy cluster.

Cluster Center: indicates the centroid of a fuzzy cluster.

Data Clustering: data clustering is the process of dividing data elements into clusters so that items in the same class are as similar as possible, and items in different classes are as dissimilar as possible.

Degree of Membership (DOM): DOM values indicate the strength of the association between a data element and a particular fuzzy cluster. Sum of DOM's for each fuzzy cluster must equal 1.

Fuzzy Clustering: in hard clustering, data is divided into distinct clusters, where each data element belongs to exactly one cluster. In fuzzy clustering, data elements can belong to more than one cluster, and associated with each element is a set of membership levels.

Group: A group is a set of geometrically consistent surface point correspondences between two instances of an object. A group must have at least 3 geometrically consistent surface point correspondences in order for the relative object pose to be calculated.

Similarity Measure: The similarity measure is a variable used as a comparison between two sets of data, such as the similarity between two spin-images. It is a single number. Typically the higher the similarity measure the more similar the data sets are to each other.

Figure 11:
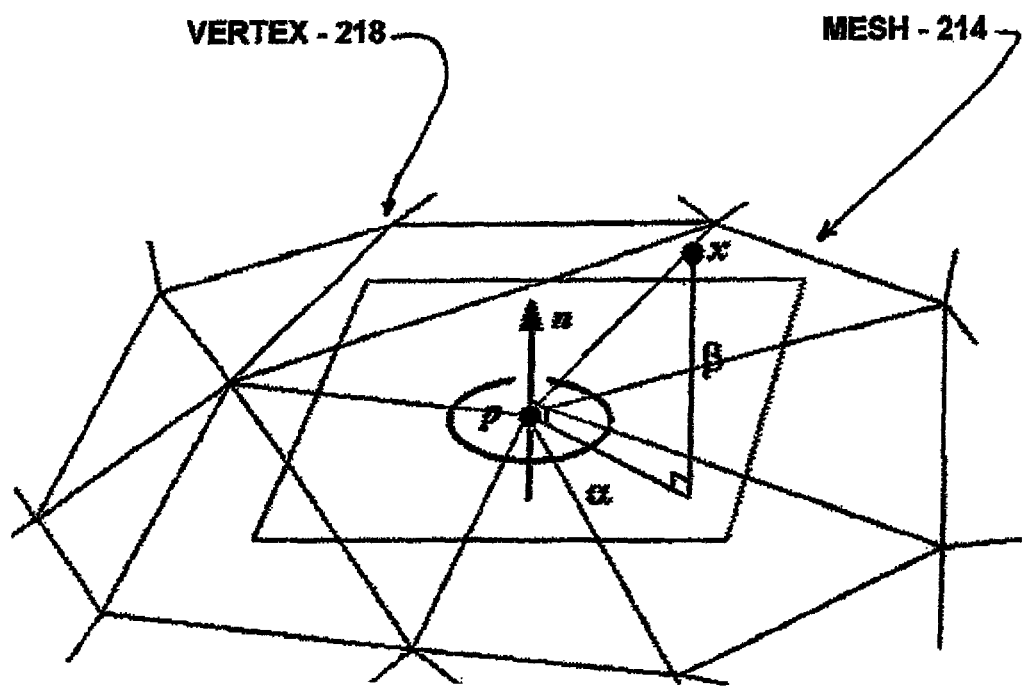
FIG. 11 is an exemplary schematic illustration showing spin-image coordinates.

Spin-Image: A spin-image is a local 2D representation of a 2.5D or 3D surface. A spin-image is constructed using an object-centered coordinate system which makes this representation independent of its pose relative to an observer (FIG. 11). By generating spin-images for all points on an object's surface a database or stack can be formed that consists of multiple spin-images which represent the whole surface of an object of interest. By using a 2D representation, established techniques for 2D image correlation can be used. It should be understood even though "image" is explicit in its name and image processing techniques are used for comparing spin-images, spin-images are technically 2D histograms, not "images".

Spin-Image Signature: A spin-image signature is a reduced order representation of a spin-image comprised of the sum of the values in the spin-image belonging to independent positive crowns, negative crowns, and sectors. In practice, however, a spin-image signature can also be a vector comprising of various statistical data from a spin-image (mean, median, std., entropy, etc.) or a property of the object at the point represented by the spin-image (Gaussian curvature, mean curvature, eigenvalues of the covariance matrix, etc.).

Stack: A stack is a collection of multiple instances of a variable belonging to a single object of interest. Each instance belongs to differing spatial or temporal locations on the object of interest (i.e. a mug). A Spin-Image Stack would then be a collection of each spin image computed at all points on the mug's surface. If the object of interest was non-rigid like a car when its doors open and close, time dependent spin-images would be included based on dynamic model of the door opening and closing.

In a preferred embodiment of the invention the spin-image module operates to estimate the most accurate pose (pose estimate) within a user-determined error threshold as quickly as possible using the scanned surface data. The spin-image module operates to compare a single scene (scanned) spin-image to all reference spin-images to determine surface point correspondences. The spin-image module then performs a grouping procedure for generating numerous geometrically consistent surface point correspondence between the scene and reference surface data. The spin-image module further performs a validation procedure such that the final pose estimate selected results in a pose estimation error within the specified threshold as quickly as possible.

In a preferred embodiment of the invention the grouping procedure performed by the spin-image module uses similarity measures calculated when matching spin-images to ensure that groups are generated utilizing only the spin-images with the highest similarity measures. Once a grouping is found that results in a pose estimate within the desired threshold, the procedure ends.

Figure 8A:
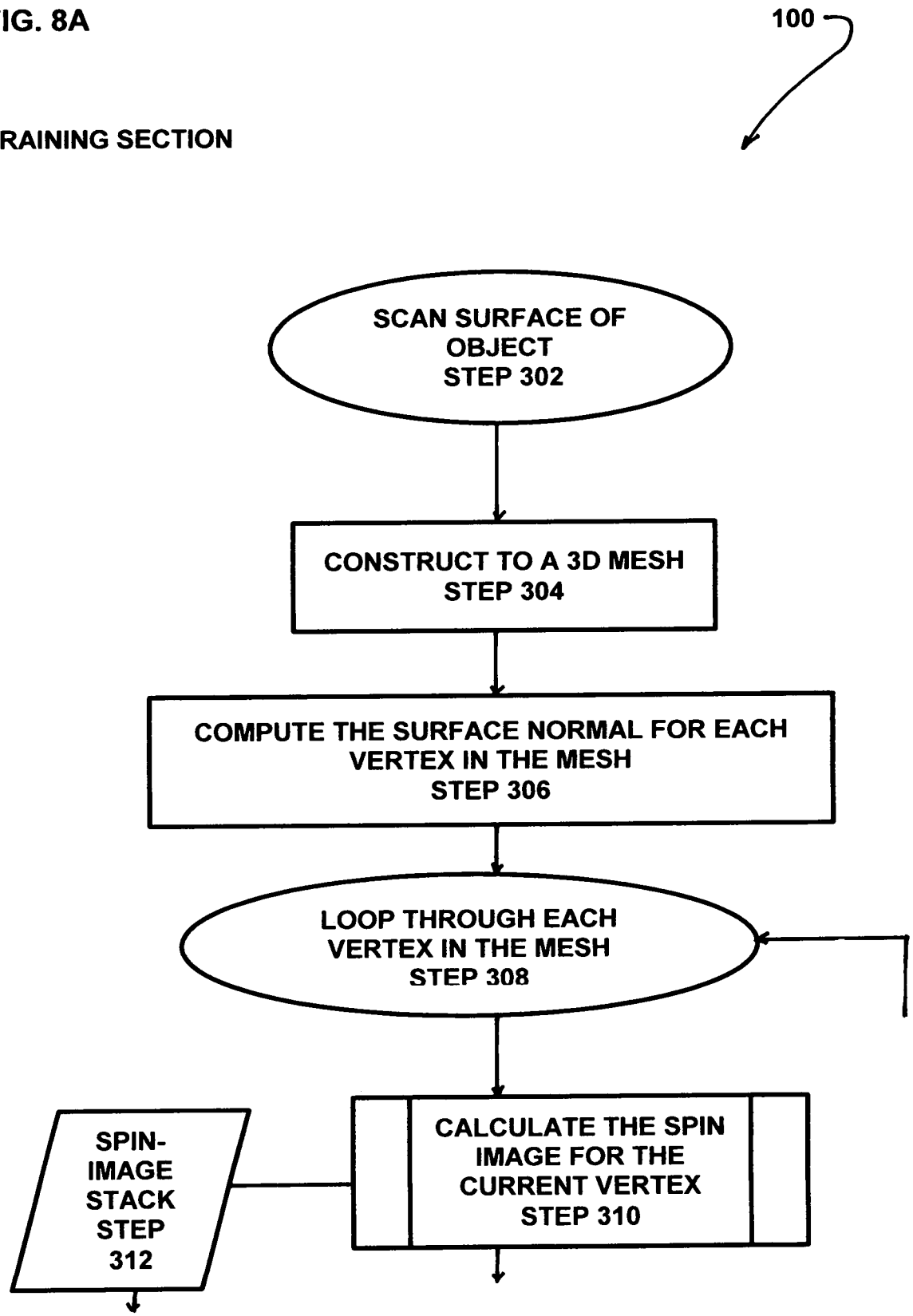
FIG. 8A-8C is a schematic representation of the process performed by the spin-image module of the system software for training the system software using information (data) obtained by the scanning component from a scan (or CAD drawing, mathematically defined surface, and the like) of an object (reference scan) taken at a particular point in time.
Figure 8B:
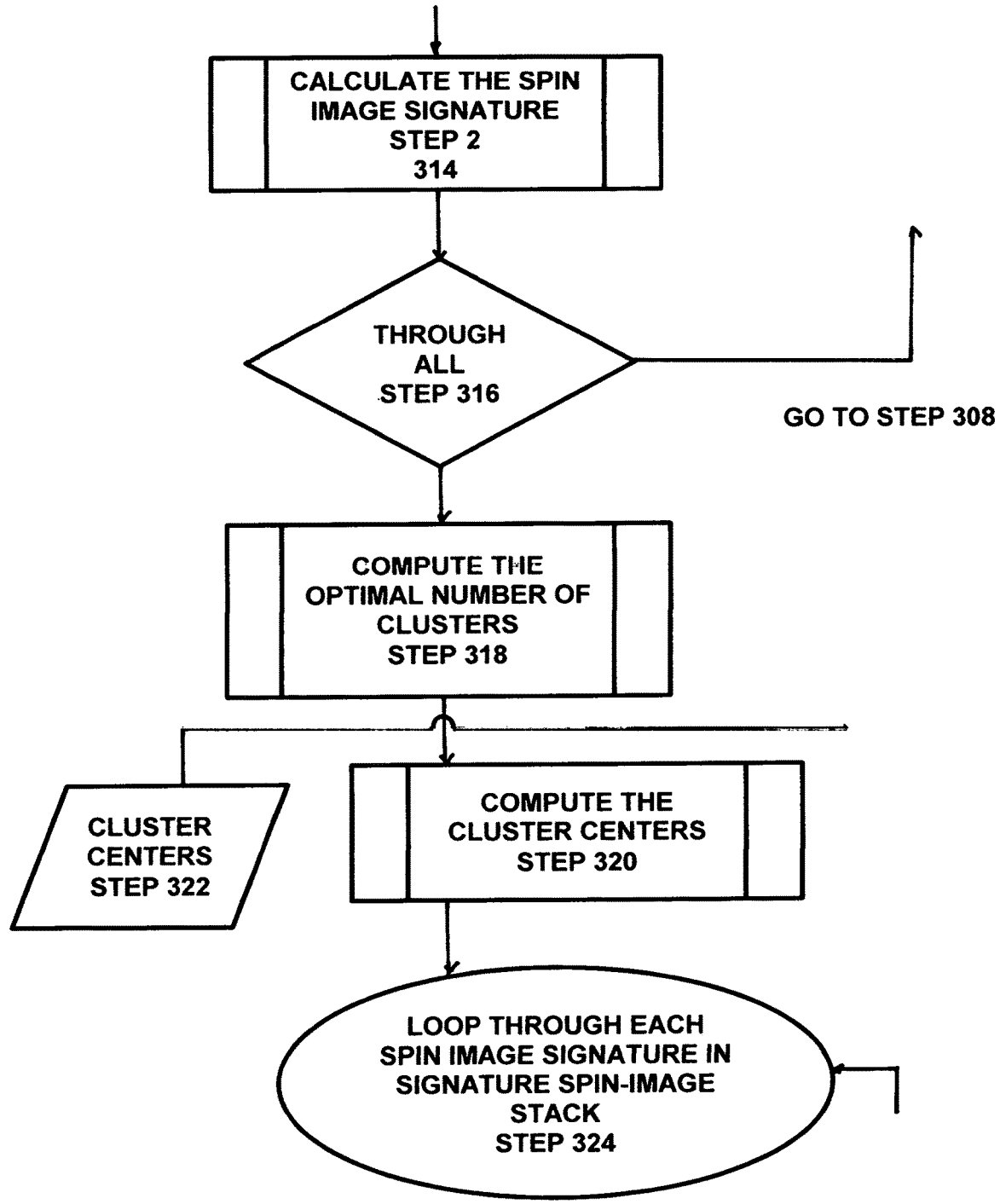
Figure 8C:
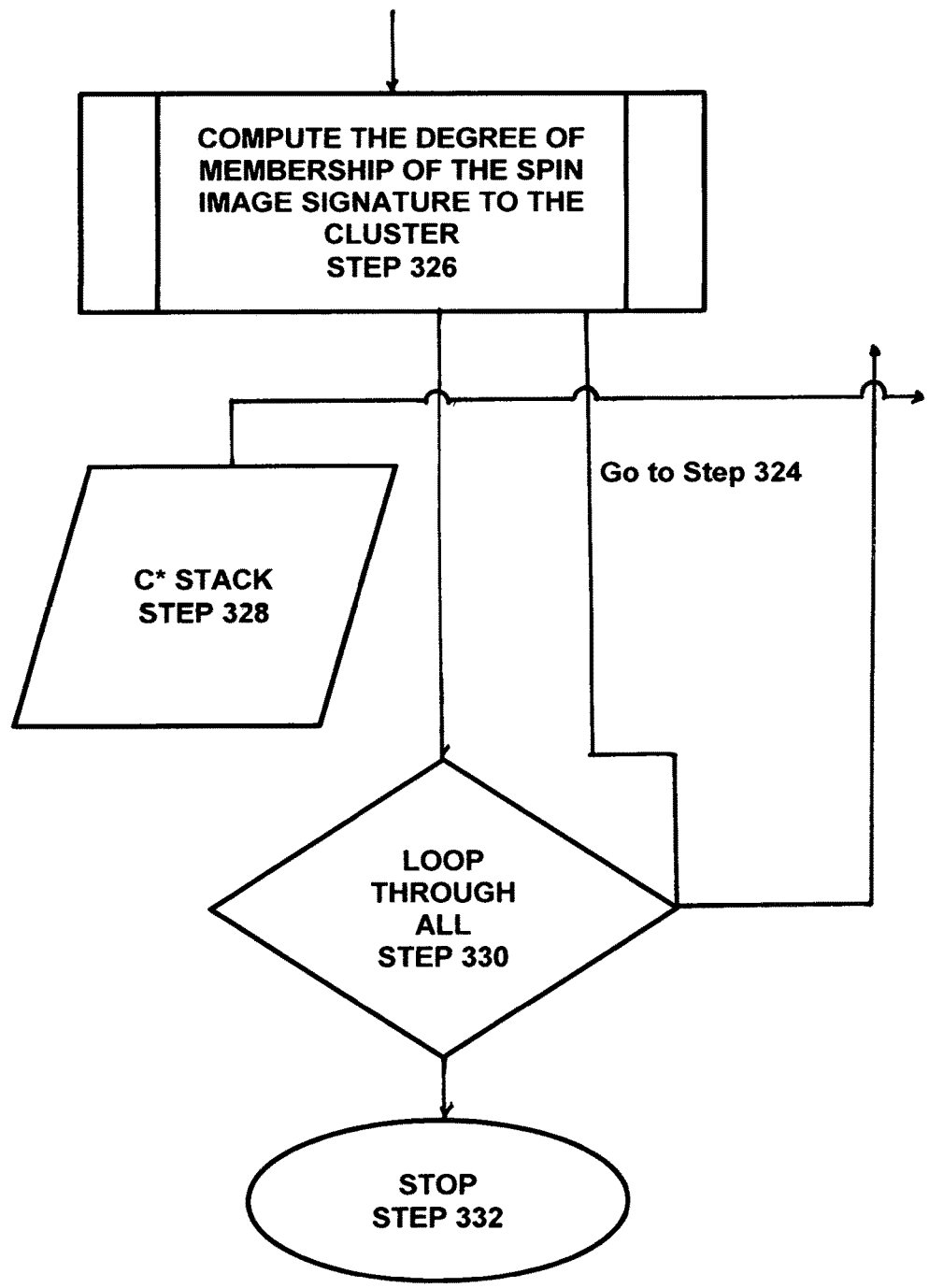
Figure 9:
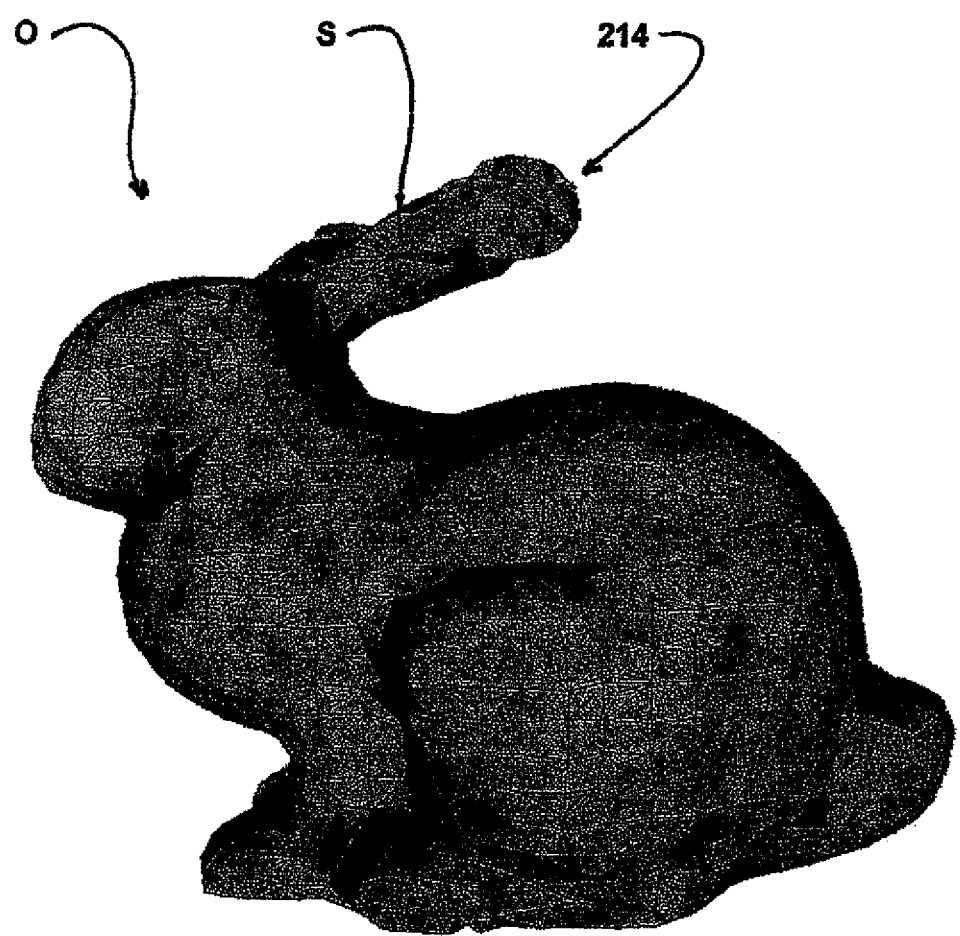
FIG. 9 is an exemplary schematic illustration showing a triangular polygonal mesh created using the information obtained from a scan of an object.

Referring to FIGS. 8A-8C, the general methodology of the process performed by the spin-image module is shown. The spin-image module operates by scanning the surface of an object (step 302) and constructing a 3D mesh of an image of the scanned 3D surface (step 304). The mesh serves as a reference for the surface and is used to train the spin-image module. An exemplary illustration of a 3D mesh 214 is shown in FIG. 9. It should be understood that the process present is robust to any type of 3D imaging technology as long as the output of that technology can be represented as a 3D polygonal mesh. The process is also robust to any type of 3D polygonal mesh representation, whether that be by 3-, 4-, or n-sided polygons. The only limitation imposed on the input mesh is that it must represent a pose distinct object (i.e.

not generally a sphere) FIG. 9 shows a 3-sided polygonal mesh 214 for referencing the surface S of an object O.

Figure 10:
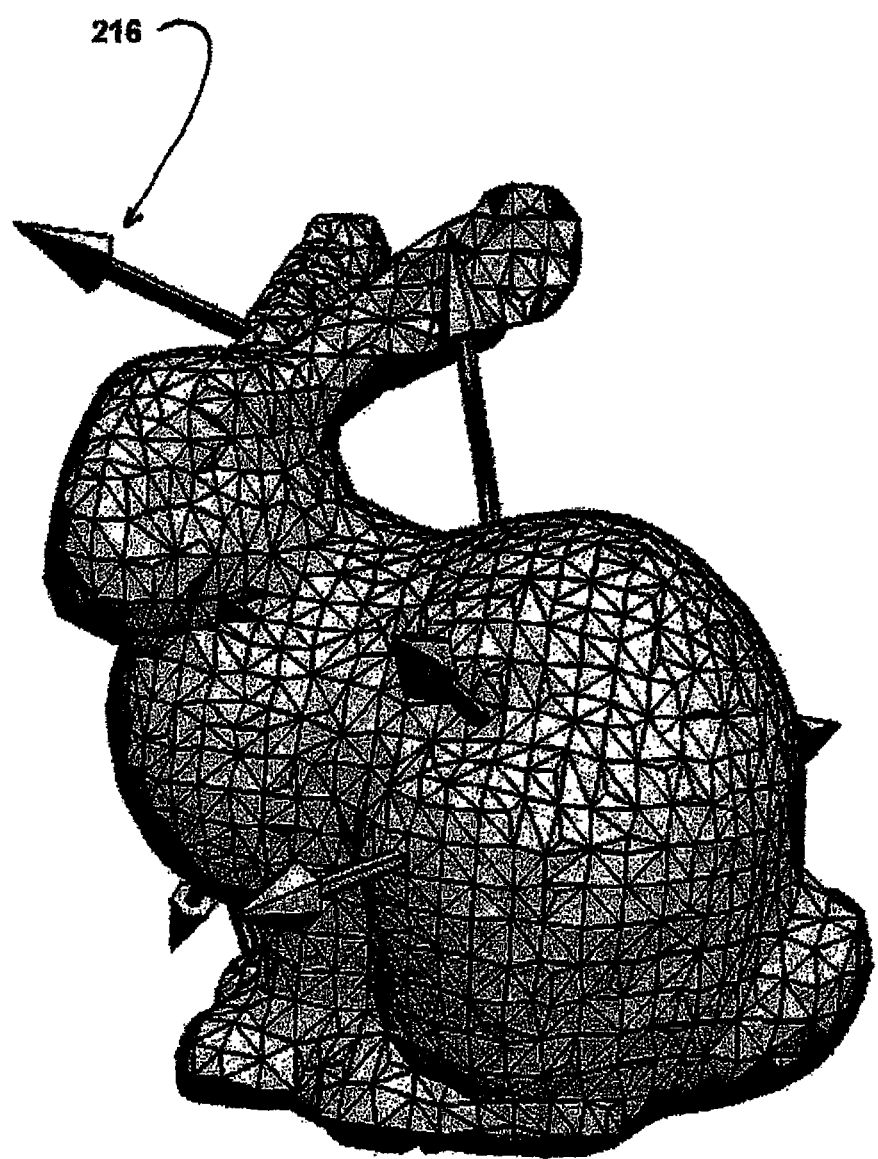
FIG. 10 is an exemplary schematic illustration showing the polygonal mesh of FIG. 9 further showing representative vertex surface normals.

The spin-image module then operates to compute a surface normal 216 for each vertex 218 in the mesh 214 (step 306). FIG. 10 is an exemplary illustration showing the surface normals 216 for each vertex 218 in the mesh 214. The vertex of a mesh is actual point measurements and is graphically defined such as shown in FIG. 11. The representation used to identify individual surface points on an object, called the spin-image, uses an object-centric coordinate system (FIG. 11) defined by each vertices' associate surface normal. Surface normals can be defined in various ways, one way to compute a surface normal from a mesh is by finding eigenvalue corresponding to the smallest eigenvalue of a covariance matrix defined by a surface point and its neighboring surface points. However, preferably the surface normal for each vertex in the mesh is implicitly encoded in the mesh. A common standard in representing meshes is to order the vertices that define a face in counter-clockwise fashion. The surface normal for each face is then defined as the cross product of two of the edges in the face. This allows for vertex surface normals to easily be computed as the average surface normal for each face in the mesh that shares that particular vertex (FIG. 10).

The spin-image module 204 then operates to loop through each vertex 218 in the mesh 214 (step 308). The spin-image process performed by the spin-image module 204 works on the principle that a 3D surface can be represented by a series of 2D images that represent the local topography of a surface at a specified location on the surface. By looping through each vertex in the mesh, that vertex and its associated surface normal calculated in step 306 are used to define an oriented point, a concatenation of the 3D location of the vertex and its surface normal. The vertex and it's normal then defines the origin and orientation of a new coordinate system used to define each spin-image respectively. It should be understood that Instead of using a loop, this process could be performed in parallel.

Figure 12:
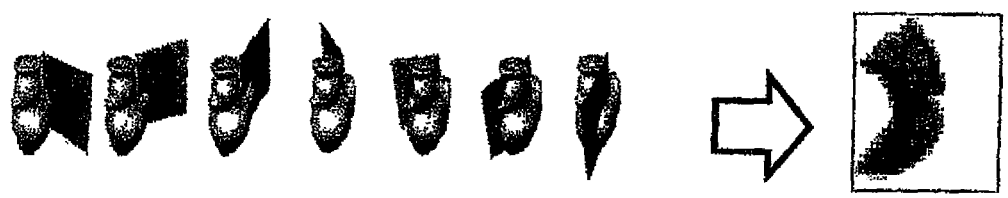
FIG. 12 is an exemplary schematic illustration showing the general methodology of spin-image generation.

The spin-image module 204 then operates to calculate the spin-image for the current vertex (step 310). For the current mesh vertex in the loop, the spin-image for that point used to represent its local topography is defined as a 2D histogram, which can be thought of as a discretization of the other vertices in the mesh relative to the coordinate system defined by the oriented point. As shown in FIG. 11, the coordinate system defined by the oriented point can be thought of as the distance in space from the vertex parallel to the vertex's surface normal (a), and the distance in space from the vertex perpendicular to the vertex's surface normal (a) as shown. It can also be thought of as a finite plane rotating about the vertex's normal. As it rotates it accumulates all the other mesh vertices it comes in contact with at the point of contact as illustrated in FIG. 12.

Figure 13:
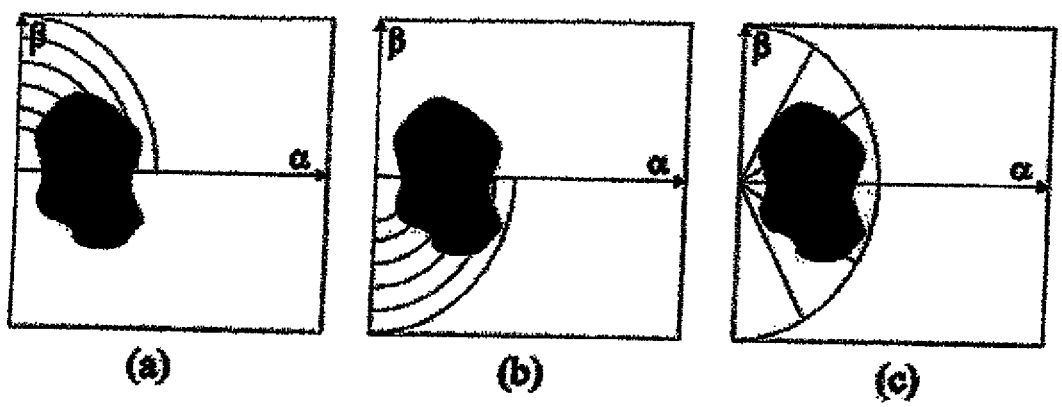
FIG. 13 is an exemplary schematic illustration showing spin-image signatures with positive crowns, negative crowns, and sectors.
Figure 14A:
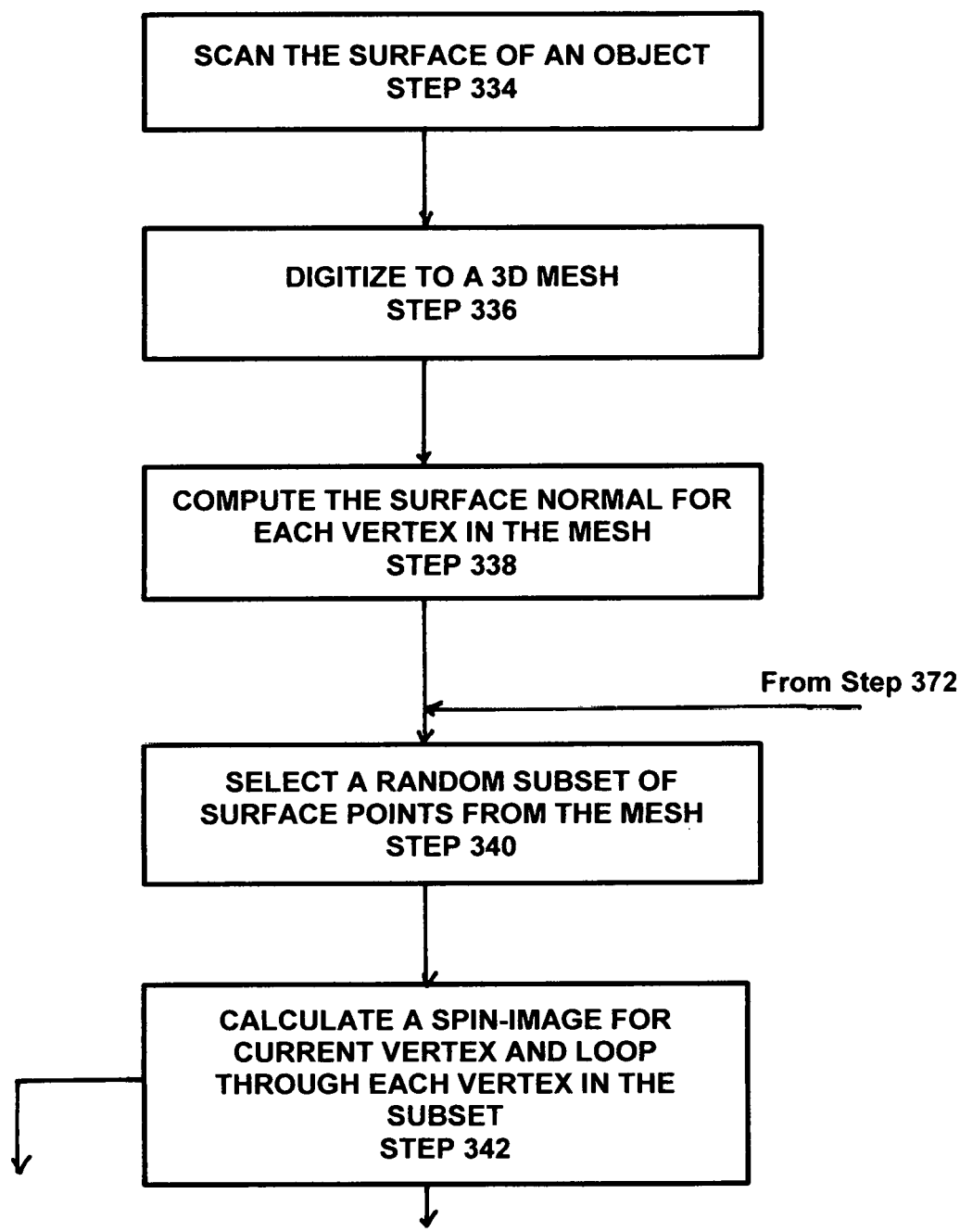
FIG. 14A-14E is a schematic representation of the process performed by the spin-image module of the system software for using information (data) obtained by the scanning component from a scan of an object taken at a particular point in time (a time different from the reference scan) whereby the system software operates to identify common points in the scans such that the scans can be overlapped onto one another such that a point along the surface of the object as shown on one image is identified as being the same point on the surface of the object as shown on the second image.
Figure 14B:
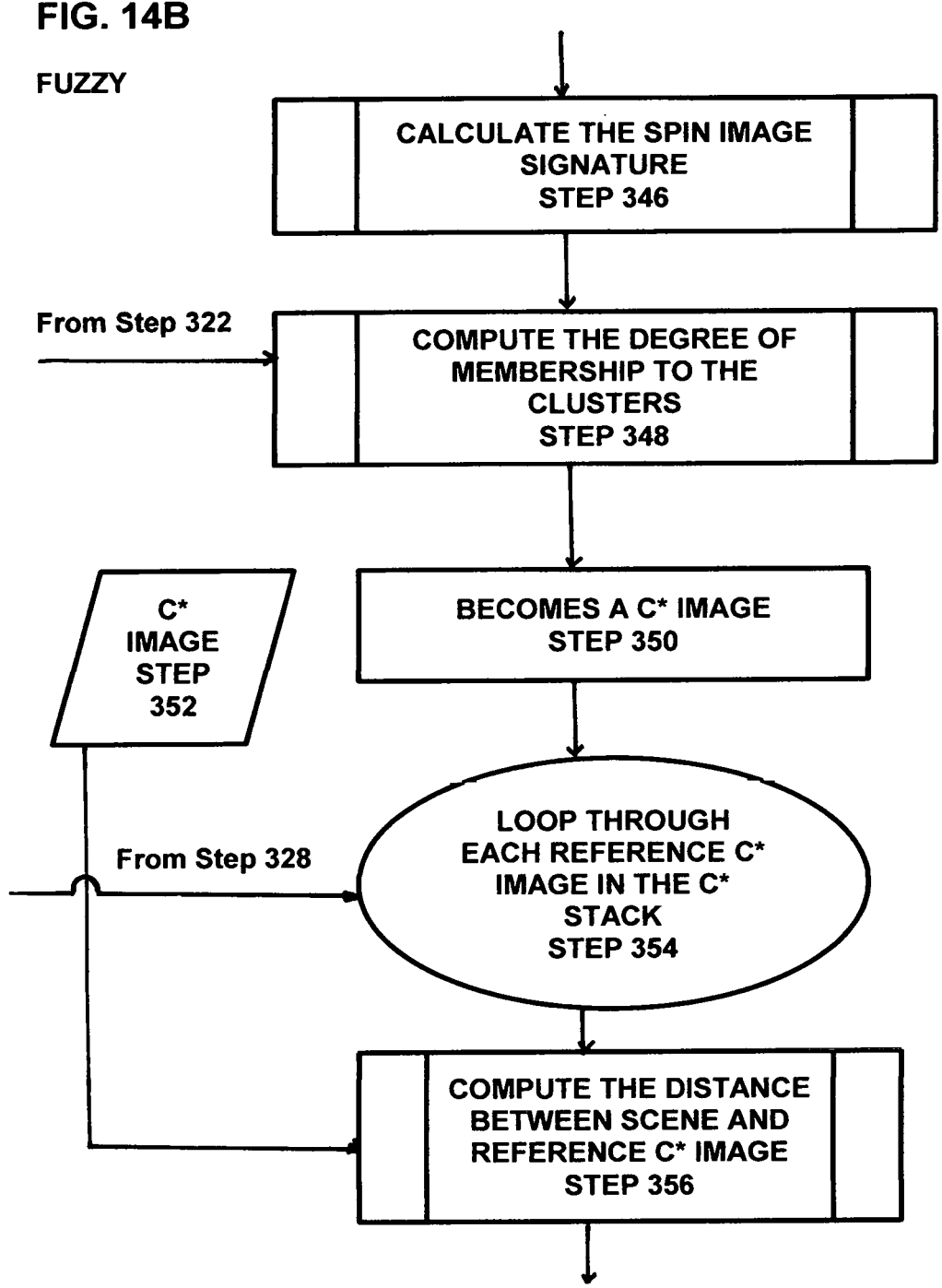
Figure 14C:
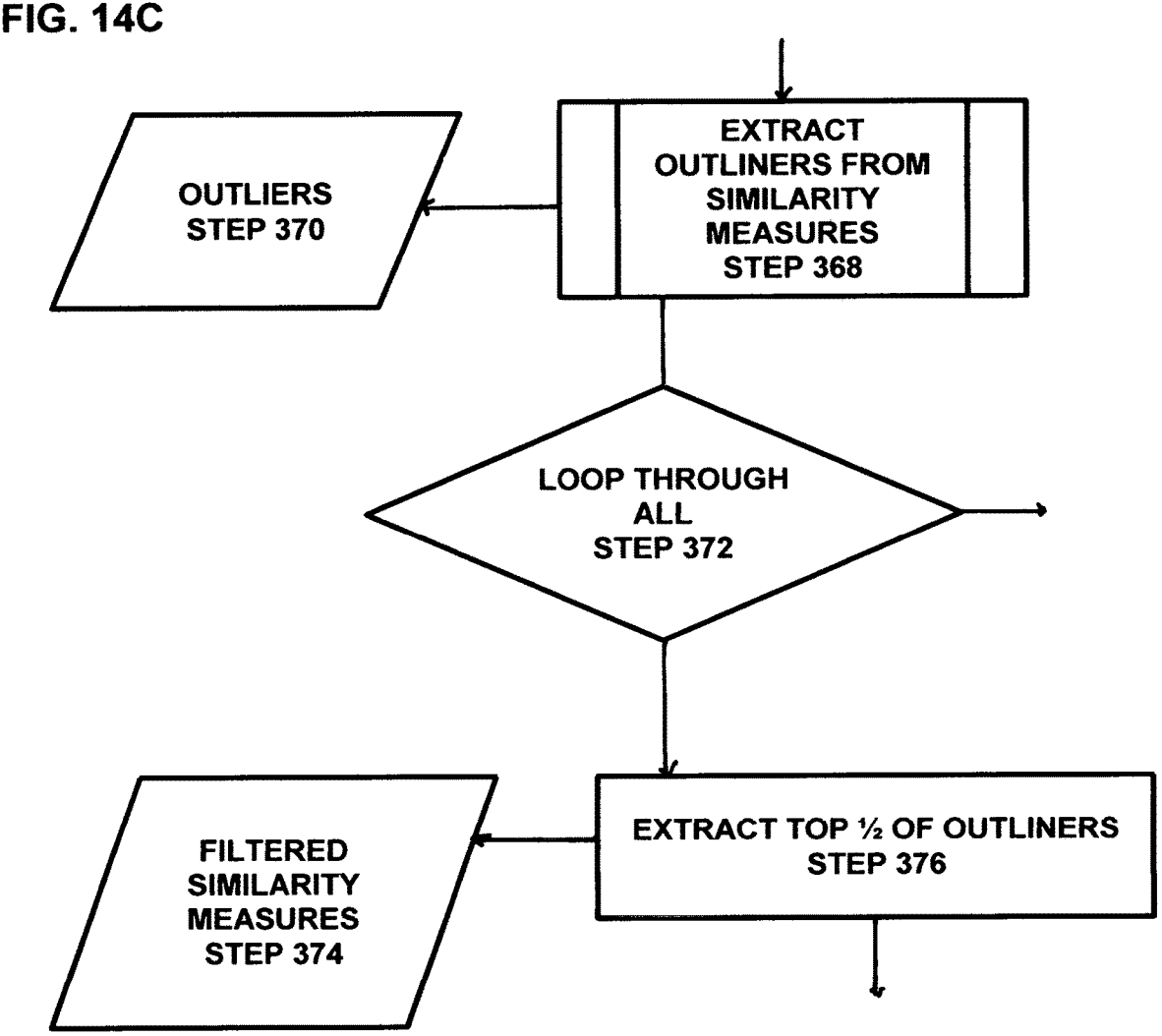
Figure 14D:
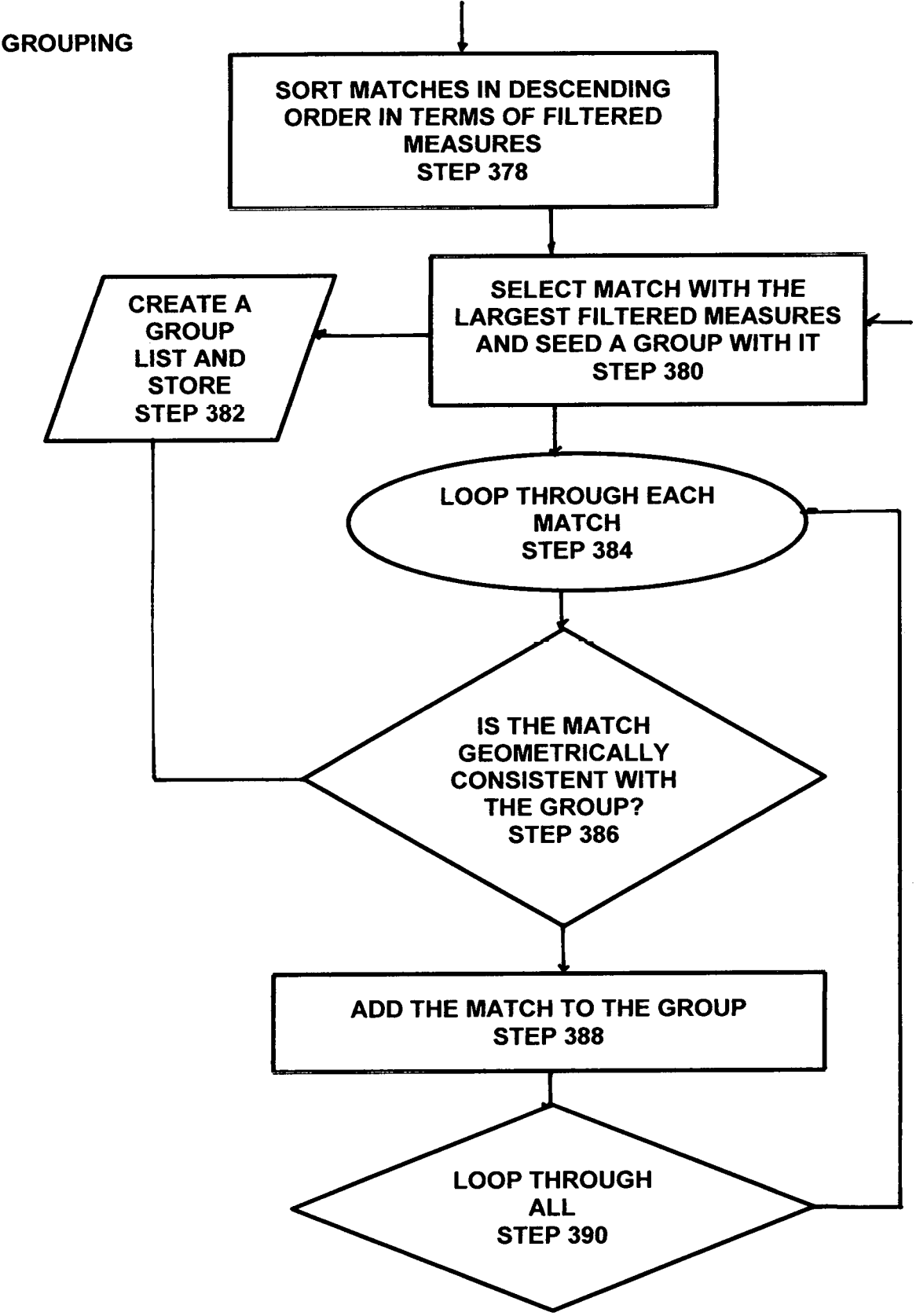
Figure 14E:
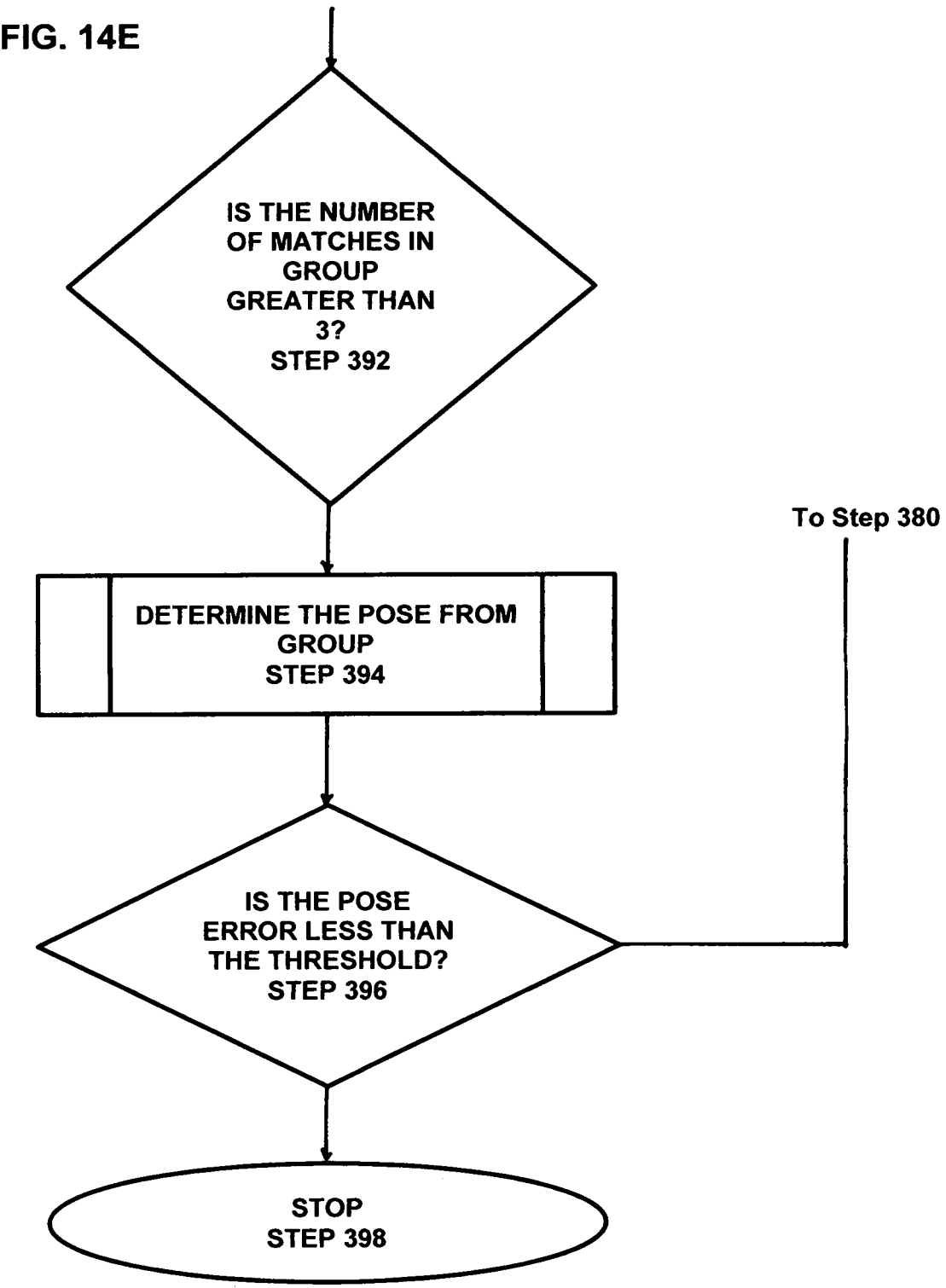
Figure 14F:
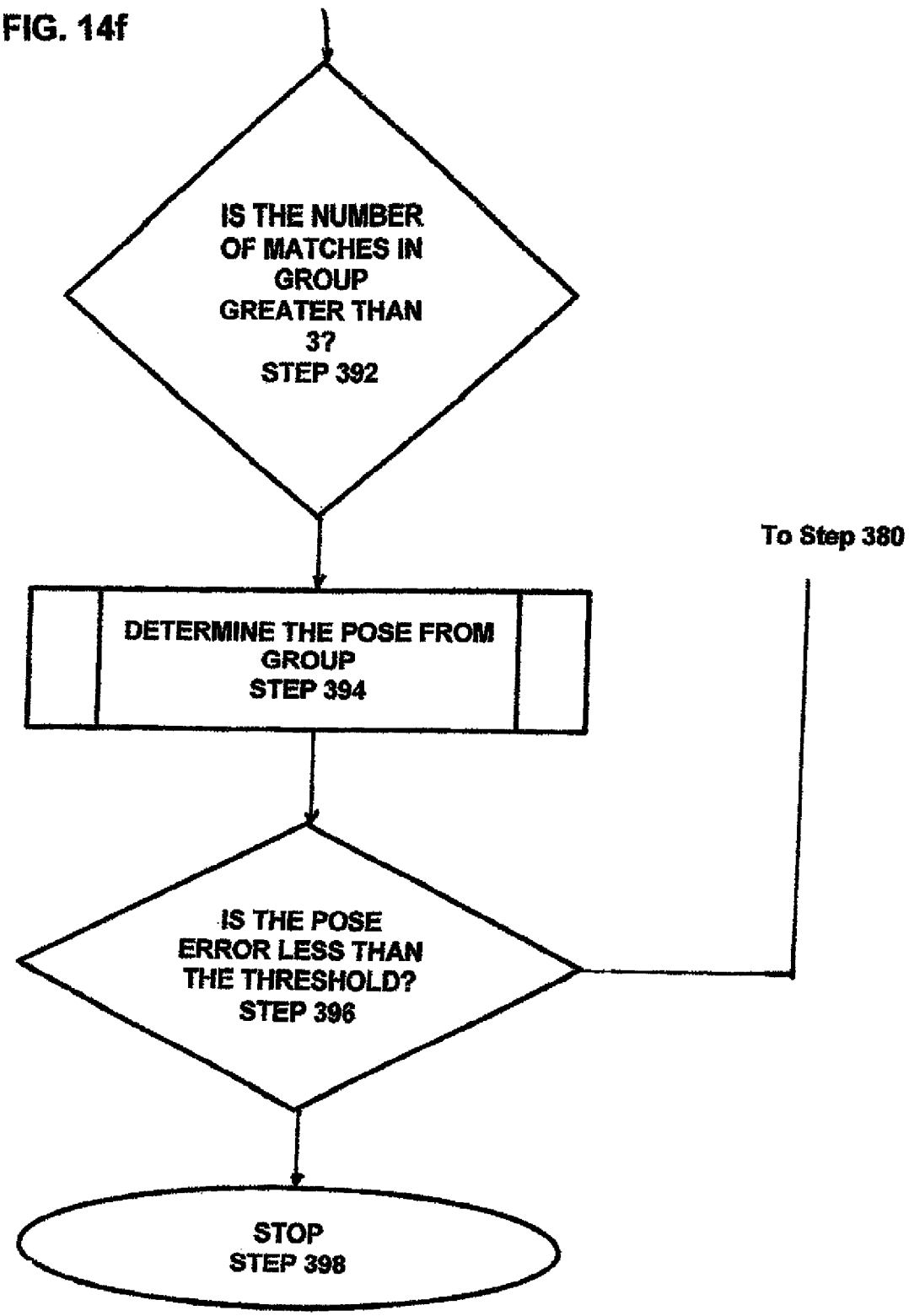

As used herein, a spin-image stack refers to the database 124 stored in the data storage device 114 and contains all the spin-images for each vertex of the reference mesh. When the spin-image module 204 operates to generate a new spin-image for the reference mesh it is appended to the spin-image stack and stored (step 312). A spin-image signature is calculated for the spin-image that has already been calculated for the current mesh vertex in the loop and a reduced order representation of the spin-image using spin-image signatures or other properties of the spin-image is determined (step 314). Referring to FIG. 13, a spin-image signature is computed as the sum of each element of each spin-image in each of the independent regions defined by (+) positive crowns, (−) negative crowns, and sectors. The number of crowns and sectors can be set based on the desired order of the reduced order representation. A decreasing number of crowns and sectors reduces the descriptiveness of the representation. Other properties of the spin-image can be used instead of crowns and sectors that can provide a reduced-order representation suitable for use in this process. They include mean, standard deviation, entropy, number of rows with all zeros, number of columns with all zeros, mean row values, mean column values, row standard deviations, column standard deviations. Also, surface properties of the current mesh vertex in the loop not encoded in the spin-image may also be used, such as temperature, curvature, color, etc. Each spin-image signature is referenced to the spin-image it was derived from. When the spin-image module 204 operates to generate a new spin-image signature for the reference mesh it is appended to the spin-image signature stack and stored. The process continues to loop through all and continue to the next vertex in the reference mesh and continue from the start of the loop (step 316).

The spin image module 204 continues to operate and computes the optimal number of clusters using fuzzy clustering such that a reduced order representation of the spin-image is made that is easy to compute, easy to compare and significantly provides order reductions to allow for rapid or real-time comparison (step 318). The degrees of membership of each spin-image signature to the natural clusters that exist in the spin-image signature stack can be used as a new reduced order representation. Before the degrees of membership can be computed, the optimal number of natural clusters in the spin-image signature stack are determined by using the validity index or similar method to find the number of clusters that minimizes the under- and over-partitioning of the spin-image signature stack. With the optimal number of cluster centers determined, the centers of the clusters in the spin-image signature stack can be determined from conventional fuzzy c-means clustering process (step 320). While it is preferred that fuzzy c-means clustering is used, it should be understood that any clustering process can be used as long as the clustering process results in fuzzy instead of crisp membership. The cluster centers are then stored in the data storage device 114 (step 322).

The spin-image module then operates to loop through each spin-image signature in the spin-image signature stack (step 324). The degree of membership of each spin-image signature in the stack needs to be determined relative to the cluster centers in the spin-image signature stack. By looping through each spin-image signature in the stack, a c*-image (defined as the degree of membership of the signature to the stack) can be generated. It should be understood that instead of a loop, this process could be performed in parallel.

The spin image module further operates to compute the degree of membership of the spin-image signature to the clusters (step 326). The degree of membership of the currently selected spin-image signature in the signature stack is computed for each cluster in the signature stack. These degree of memberships concatenated into a vector, define a c*-image. A c*-image provides a nonlinear mapping from a spin-image that enables, rapid comparison that results in significant speed-ups in estimating pose which is calculated as the rigid transformation T that minimizes the error Et between scene surface points S and reference points r as in the following equation:

$$\Sigma_T = \Sigma \|s_i - T(r_i)\|^2$$

Each c*-image is referenced to the spin-image signature and therefore the spin-image that it was derived from. A c*-stack within the data storage device 114 is created to contain all the c*-images for each vertex of the reference mesh. So, each time a new c*-image is generated for the reference mesh it is appended to the c*-stack and stored (step 328). The spin-image module continues to the next spin-image signature in the signature stack and continues from the start of the loop (step 330). Once the spin-image stack and c*-image stack has been generated and stored for the reference mesh training is complete and the process stops (step 332). With this data, the following process can be used to rapidly identify matching surface points between captured 3D meshes and the reference mesh. This allows the relative pose between the two meshes to be determined.

Referring to FIGS. 14a-14f, after the spin-image module has completed the training process using an image of a scanned object (reference object), the spin-image module can continue to operate to compare by scanning an object (or a portion of an object) believed to be the same object as the reference object (object scanned for the training process). The spin-image module operates to identify whether or not the scanned object (or a portion thereof which is the new scan of an object) is the same as the reference object (or portion of the reference object); determines the relative pose (position and orientation) of the scanned object; and aligns the scanned object with the reference object to allow for automatic comparison.

As shown, in a preferred embodiment of the process of the subject invention, a scan of an object to be compared ("scanned object") is performed (step 334) using the appropriate scanning device and the spin-image module operates to create a 3D mesh of the surface of the object (step 336). The spin-image module then operates to compute the surface normal for each vertex in the mesh (step 338) and operates to randomly select a fixed number of vertices from the mesh (step 340). It should be understood that the number of vertices selected can be a hard number fixed prior to performing the process or it can be dynamically adjusted based on the process's confidence as to whether an instance of the reference object is present in the scene (scanned) image or not as a function of the total number of vertices in the mesh (for example, 10% of vertices in the mesh). Increasing the number of vertices decreases the speed at which the process is performed while increasing the probability of reaching a correct solution. For an illustrated example, consider a structured environment where the likelihood that an instance of the reference object will be present in the mesh of the scanned object is high, such as when the objects are machines (or machine parts), or a body part of an individual, the number of randomly selected vertices can be low. In contrast, for an unstructured environment such as in an unknown building looking for hazardous material containers, the system operates as an autonomous system and identifies the pose of the object of interest. It then uses that pose information as it moves about the environment by "intelligently" selecting random points near the objects previous location prior to the intelligent system moving. This allows the process to use fewer randomly selected vertices. The number of randomly selected vertices can then continue to reduce as the system confidence in its understanding of the environment increases.

The spin-image module operates to loop through each vertex in the subset (step 342) and for each randomly selected vertex operates to: calculate the spin-image for the current vertex and generates the spin-image signature (step 346). The degree of membership to the clusters using cluster centers and the degree of membership of the current spin-image signature to the cluster centers are calculated (step 348) using the following equation:

$$\mu_{ki} = \frac{1}{\sum_j \left(\frac{\|c_k - x_i\|}{\|c_j - x_i\|}\right)^2}$$

thereby generating a c*-image (step 350) for the currently selected random scanned mesh vertex which are stored in the data storage device as a c*-image (step 352).

The spin-image module then operates to loop through each reference c*-image in the c*-stack, and compares the current scanned c*-image with that of each reference c*-image in the c*-stack (The c*-stack computed in step 328 and the current scene (scanned) c*-image computed in step 350) (step 354). The module than operates to calculate a metric that measures the distance between the current scene (scanned) c*-image and the current reference c*-image (step 356). This can be any distance measure such as $L^1$, $L^2, \ldots, L^n$ norm, or a special normalized metric that takes advantages of the properties of cluster degrees of membership. In particularly the property that the sum of the degrees of membership for all clusters always equals 1. One such metric is the normalized sum square error developed using the following equation:

$$I_j = \frac{1}{2}\sum_i (r_j^*(i) - s^*(i))^2$$

This distance then serves as a measure of the similarity between the reference and scene (scanned) c*-image.

The spin-image module operates to calculate the distance between the reference c*-image and the scene (scanned) c*-image to determine whether or not it passes some predetermined threshold criteria. For the distance measures, any distance below the threshold would pass the test and be considered as possibly being matching c*-images. All other would be considered as not matching c*-images. Setting this threshold is simplified when using a normalized distance metric such as determined by equation:

$$I_j = \frac{1}{2}\sum_i (r_j^*(i) - s^*(i))^2$$

It has been found that by setting the threshold, the process can balance its ability to discriminate between c*-images (resulting in faster pose estimation) and being robust to sensor noise and cluttered unstructured environments. If the distance is within the threshold, then continue, otherwise return to step 354, using the next reference c*-image in the c*-stack.

If the distance is within the threshold, the spin-image module operates to find the spin-image in the spin-image stack corresponding to the reference c*-image. Because the reference c*-image from the c*-image stack and the scene (scanned) c*-image are similar, there is a high likelihood that the reference spin-images and the scene (scanned) spin-images from which the c*-images were derived are similar. Because each c*-image in the c*-stack references the spin-image it was derived from in the spin-image stack, this reference can be used to retrieve the spin-image in the spin-image stack corresponding to the reference c*-image. The similarity measure with the spin-images is computed using the reference spin-image and the scene (scanned) spin-image, and added to the similarity measure list. This can be as simple as $L^1$, $L^2$, ... $L^n$ norms, or more sophisticated like the similarity measure computed using equations where P and Q are spin-images, $p_i$ and $q_i$, are the $i^{th}$ element of P and Q respectively, $\eta$ is the number of overlapping elements in P and Q, and A is a property of the spin-image stack:

$$R(P, Q) = \frac{\eta \sum p_i q_i - \sum p_i \sum q_i}{\sqrt{(\eta^2 \sum p_i^2 - (\sum p_i)^2)(\eta^2 \sum q_i^2 - (\sum q_i)^2)}}$$

$$\mathbb{C}(P, Q) = \operatorname{atanh}(R(P, Q))^2 - \frac{\lambda}{\eta - 3}$$

When a scene (scanned) and reference spin-image are found to be similar, it implies that there is high likelihood that the vertices in the mesh used to compute the spin-images are the same points on the surface of the object. The similarity measure for the scene (scanned) spin-image compared to the current reference spin-image in the spin-image stack is then appended to a list used to store the similarity measure for the scene (scanned) spin-image to all the reference spin-images in the spin-image stack (step 364). The process then continues to the next reference spin-image in the spin-image stack and continues from the start of the loop.

In order to match spin-image in a manner that is robust to sensor noise and scene clutter in unstructured environments, the process operates to extract similarity measures from the similarity measure vector that indicate significantly higher similarity when compared to the vector as a whole (step 368). Preferably, this is done by extracting all extreme outliers from the vector. The outliers have significantly higher probability of indicating the correct match for the scanned and reference spin-images. It should be understood that other filtering operations could also be used such as taking the upper x % of similarity measures in the vector. This serves as a filtering method used to filter the most likely matches for the currently selected random scene vertex. Outliners of similarity measures of all scene (scanned) spin-images to the spin-image stack are stored in the data storage device (step 370). Each outlier references what scanned and reference surface points were used to generate the spin-images used in the similarity measure calculation. This process then loops to the next randomly selected scene vertex and continues from the start of the loop (step 372).

After the process of step 372 is complete the process continues by extracting likely matches from outliners variable and serves as a filter for all the outliers computed for all the randomly selected scene vertices and stores the filtered outliners of similarity measures in the data storage device (step 374). Previously the matches were filtered based on the matches for an individual scene vertex. For this step, the matches are filtered based on the matches for all randomly selected scene vertices. Preferably, the top outliners are set as the matches in the outliers variable that are greater than some percentage of the greatest similarity measure in the outliers variable. This percentage is typically set to 50% (step 376).

The spin-image module continues performing the process by sorting filtered measures in descending order in terms of the similarity measure (step 378). The matches stored in the similarity measure are sorted in descending order based on the similarity measure between the scene (scanned) spin-images and the reference spin-images. Once sorted, the first match in the list then represents that match that has the highest probability of being a correct match. The match with the largest similarity measure in the filtered measures variable is selected and a group is seeded with it (step 380). By taking the match with the largest similarity measure in the filtered measures variable the process starts to create a group of surface point correspondences in order to compute the pose of the scanned object relative to the reference. Using the match with the highest similarity measure ensures that the match with the highest probability of being correct is used in the group. This increases the probability of finding a valid grouping that results in a correct pose estimate in the least amount of time. As used herein a group is a list of matched reference and scene vertices used to compute relative pose. The process continues by creating and storing the group list (step 382) in the data storage device. The process continues by looping through each match in the sorted filtered measures variable computed in step 378 (step 384). As shown the current match is checked to determine if it is geometrically consistent with all the matches already in the group (step 386). Because symmetries may exist or there may be similar regions that exist on the scanned object, the list of filtered measures may have a single scene (scanned) spin-image matching with multiple reference spin-images with high similarity measures. If the match is geometrically consistent with the group then add it to the group (step 388). The process continues to the next match in the stored filtered measures variable and goes to the beginning of the loop (step 386).

The spin-image module continues performing the process and checks the number of geometrically consistent surface point matches are present in the group. Mathematically, 3 matches must be present in the group in order to compute pose, however it should now be understood that the larger the group the better indication that the group will result in an accurate pose estimate. If there is less than 3 in the group, then the group's seed match is removed from the filtered measures variable, the group is cleared, and the process returns to step 380 (step 392). Otherwise, the process continues. It should be understood that the number can be any value greater than or equal to 3.

Once a group of geometrically consistent surface point matches is identified, the relative pose of the scanned object to the reference (or visa versa if desired) object can be computed as the transformation the minimized the error between the locations of the surface points in the group as shown in the following equation (step 390).

$$\Sigma_T = \Sigma \|s_i - T(r_i)\|^2$$

It should be understood that a rapid method is required to determine if, based on the matched surface points, the resulting pose is valid. This can be performed by checking the L2 norm between each surface point location and the angle between the surface normals for each surface point. For example: Set a threshold that all matches points must be aligned within 1 mm and 3 degrees. By tightening or relaxing the thresholds, the process can balance between speed and accuracy. The spin-image module operates to determine if the error is less than the threshold then continue, otherwise remove the group's match from the filtered measures variable, clear the group, and return to step 380 (step 396). The process can then be stopped, or it can be refined using a standard iterative closest point method that utilizes not just the location of the surface points but their normals as well (step 394).

Accordingly, it should now be apparent that the system operates such that the spin-images generated and used for matching is defined by significantly fewer numbers thereby allowing for faster spin-image comparisons and thereby faster pose estimation. The system also operates by calculating degrees of membership of a spin-image in feature clusters and calculates a similarity measure. The system then filters the reference spin-images by comparing the reference spin-images by their degrees of membership and uses a similarity measure above a user-set threshold. The spin-images are then filtered based on similarity measures and a group is constructed placing them in order of having the highest similarity measure. A pose estimate is then made. If the pose error produced by the pose estimate is less than a user-defined error threshold, the pose is complete, if not the system proceeds using the next point match to seed a group.

Data Analysis Software Module (Comparing 3D Images):

It should now be apparent to one skilled in the art that the above-described system and process provide an efficient method of representing and matching individual points of an object's surface S necessary for aligning two or more scanned images. Once the images are properly aligned (superimposed one over another) using a global alignment method such as by the process described above, the system operates to compare the images.

Once the spin-image module 204 of the system software 200 has properly aligned the images of two or more scans of an object, the data analysis software 202 operates to determine point-by-point differences between the 3D surfaces of the object represented by the images. However, even with the surfaces of the images aligned, the point measurements for each surface may not be in the exact location because of the technique used to generate the surface representation, or due to actual differences between the two surfaces. For an exemplary illustration an image may be a surface represented by a 3D mesh generated from a 3D CAD model of a mechanical part to be manufactured. A second image may be a surface represented by a 3D mesh resulting from scanning a mechanical part after manufacturing. Any differences between the two images would be the result in errors introduced during the manufacturing procedure of the part. For another exemplary illustration a first image may be a 3D mesh from a scan of a sprocket that was manufactured within manufacturing tolerances. A second image may be a 3D mesh from a scan of the same sprocket having a burr on the edge of its spline. Accordingly, a method is needed to accurately determine the "same" surface points located on both images so that point by point measurements can be made. It should be understood that the images do not need to be the result of a 3D scan, it may also be a mathematical model of a surface, or even a surface drawing such as a 3D CAD drawing as long as the 3D surface is represented by point clouds or 3D meshes. It should also be understood that the method present is not limited to 3D images, 2D images and higher dimensions are possible.

Once the "same" surface points are located, differences in any available surface data can be computed. For example: surface displacement, color differences, thermal differences, etc. (It should be understood that all measured surface data can be corn pared.

Various methods have been developed for providing point-by-point comparisons between 3D surfaces that solely rely on the point measurements available in the 3D meshes used to represent the surface. One such method for $$D_H(A, B) = \max\left\{\sup_{a \in A} \inf_{b \in B} D(a, b), \sup_{b \in B} \inf_{a \in A} D(a, b)\right\}$$

comparing two 3D surface and measuring the differences between them is the Hausdorff distance ($D_H$) or metric. The Hausdorff distance is described by the above equation, where A and B are the point sets for two 3D scans, where sup represents supremum, and where inf represents infimum.

In the case of measuring the differences between two 3D surface (surface A and surface B), this metric basically finds the closest point in surface B for each point in A and the closest point in surface A for each point in B. The maximum distance for each point is then the Hausdorff distance. This is an effective metric for determining the distance between surfaces when only point data is known, but when the surfaces are represented by 3D meshes, points and surface normals are both known and the surface normals can be used to perform more accurate point by point difference measurements between the two surfaces.

Figure 15:
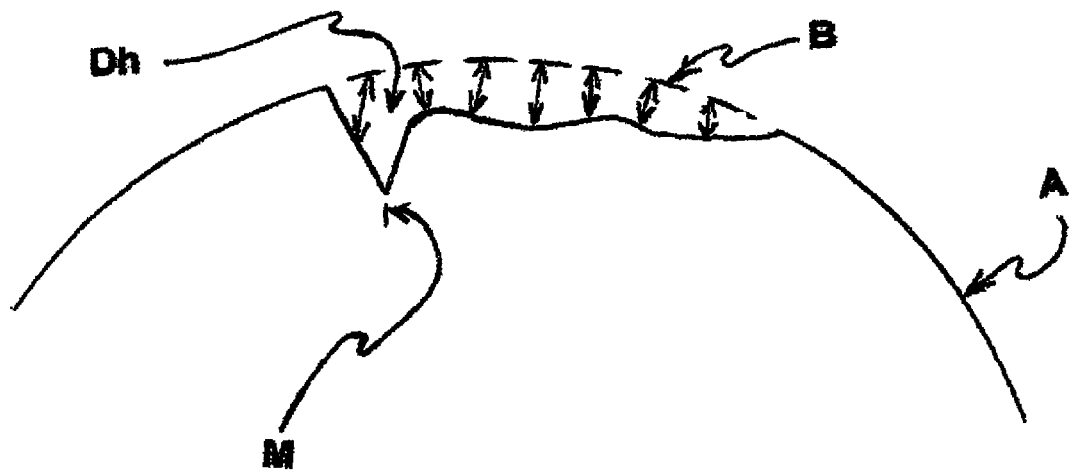
FIG. 15 is a schematic representation of surfaces illustrating the Hausdorff distance locating the distance between points on the surfaces.

Referring to FIG. 15, an illustrative example of how the Hausdorff distance ($D_H$) locates the "same" surface points between surface A and surface B. As shown this metric under estimates the distance between each surface point on A and B because it effectively identifies the "closest" points in A and B as the "same" surface points. Because of this, the true maximum distance located at M is never measured.

Figure 16:
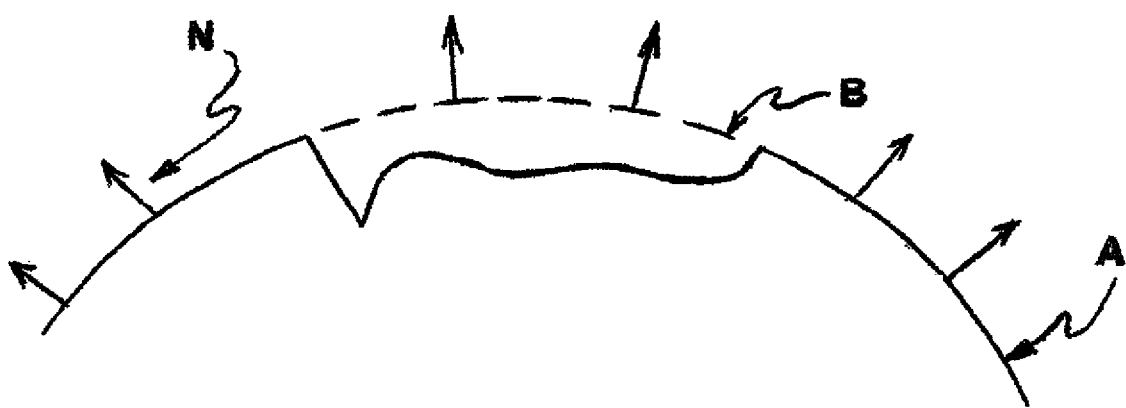
FIG. 16 is a schematic representation of the surfaces of FIG. 15 showing surfaces with surface normal along one surface.

The data analysis module 202 operates by identifying the "same" point on surface B as the point of intersection between surface B's surface normal at said point and surface A this metric is called the normal oriented distance (Dn) (FIG. 16 shows surface A, surface B, and surface B's surface normals N). It should be understood that the intersection can be along the positive or negative direction of the surface normal. This allows for locating "same" points when surface A is either above (along the positive normal direction) or below (along the negative normal direction) surface B. Unlike previously developed systems, this method performed by the data analysis software 202 allows the "same" point on surface A to not only be vertices in the surface mesh but also any of the continuum of points located on the faces of the mesh used to interpolate between actual surface measurements represented by vertices. This process results in a more accurate measurement by being able to treat surface A as a continuous surface, resulting in a more accurate identification of "same" points between the two surfaces, thus not underestimating the measurements between the two surfaces such as occurs using previous developed systems.

Figure 17:
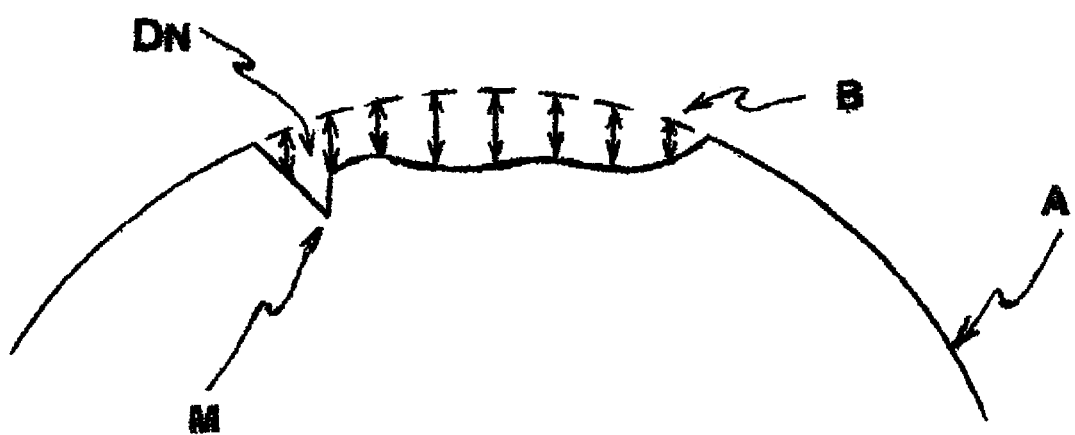
FIG. 17 is a schematic illustration of surfaces of FIG. 15 showing normal oriented distance locating the same surface points between the two surfaces using the process of the subject invention.

Referring to FIG. 17, an illustrative example showing the process whereby the normal oriented distance ($D_N$) locates the same surface points between surface A and surface B. The metric provides a true distance measurement at the maximum distance located at M which is unlike previously developed methods. It should now be understood that:

$$D_N(A,B) \neq D_N(B,A)$$

where the first argument of $D_N$ is the surface that has normals used to compare the two surfaces. If either surface A or surface B serves as a truth for which the differences should be measured about, then the normals for the truth surface are used for identifying "same" points and measuring the differences between the two surfaces. If neither of the surfaces serves as a truth surface, then $D_N(A,B)$ and $D_N(B,A)$ can be combined in a similar fashion to the measures in the Hausdorff distance. It should now be apparent to one skilled in the art that the comparison can be made about any surface vector. The surface normal provides a general solution applicable to all surfaces, however scenarios where knowledge may be available as to how a surface has changed over time. For an example, mathematical growth models for biological life forms or models of material expansion/contraction based on environmental conditions (i.e. temperature and pressure). These models could then be used to compare two surfaces with extreme accuracy and precision.

In a preferred embodiment, a single surface is provided and the process operates to compare the single surface to a truth for that surface that is not available. For an illustrative example, consider when a patient goes to a physician for medical treatment for a surface wound. The physician scans the wound. However, the physician is unable to measure a depth profile of the wound or wound volume, because a scan is not available of that patient before developing the wound, until now systems have not been developed that can make such measurements.

Figure 18:
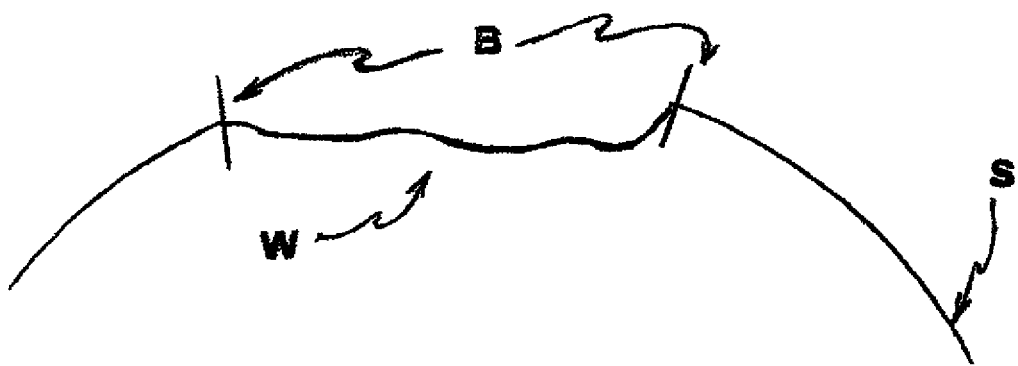
FIG. 18 is a schematic illustration showing a surface with an area of interest and a boundary.

The system utilized by the subject invention operates to perform such measurements by estimating a truth surface from the available surface. It should be understood that the process utilized by the subject invention can be applied to any scanned surface with a defect or anomaly where a comparison to an unavailable truth surface is desired. In a preferred embodiment, the data analysis software 202 operates by identifying the boundary of the area of interest (in the instant example the wound) (step 220) and determines if the area of interest is inside or outside of that boundary (step 222). The area of interest of the surface is then labeled (step 224). This boundary identification can be performed by a human in the loop or by an automated process that inspects properties of the surface such a curvature, texture, color, temperature, and gradients of each of the proceeding to determine the boundary. Any measurable surface data and measurements derived from the measurable surface data (i.e. gradients) can aid in the automated process for identifying the wound boundary. FIG. 18 shows a surface S with an area of interest, such as a wound W and a boundary B. It should be understood that although the illustrations used in this example are 2D, this method applies to higher dimensional surfaces as well.

Figure 19:
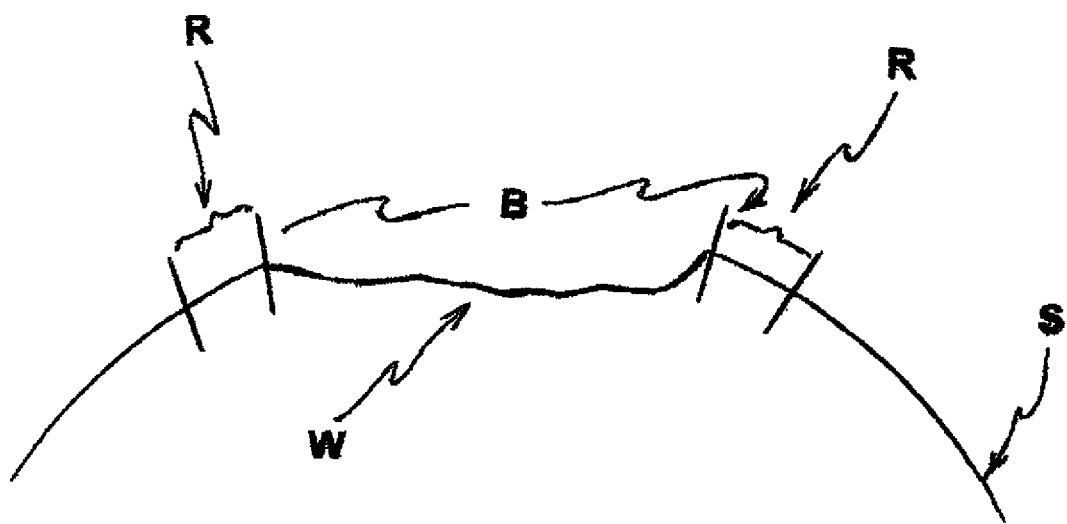
FIG. 19 is a schematic illustration showing boundary regions around an area of interest, the area of interest, and the boundary around the area of interest.
Figure 20:
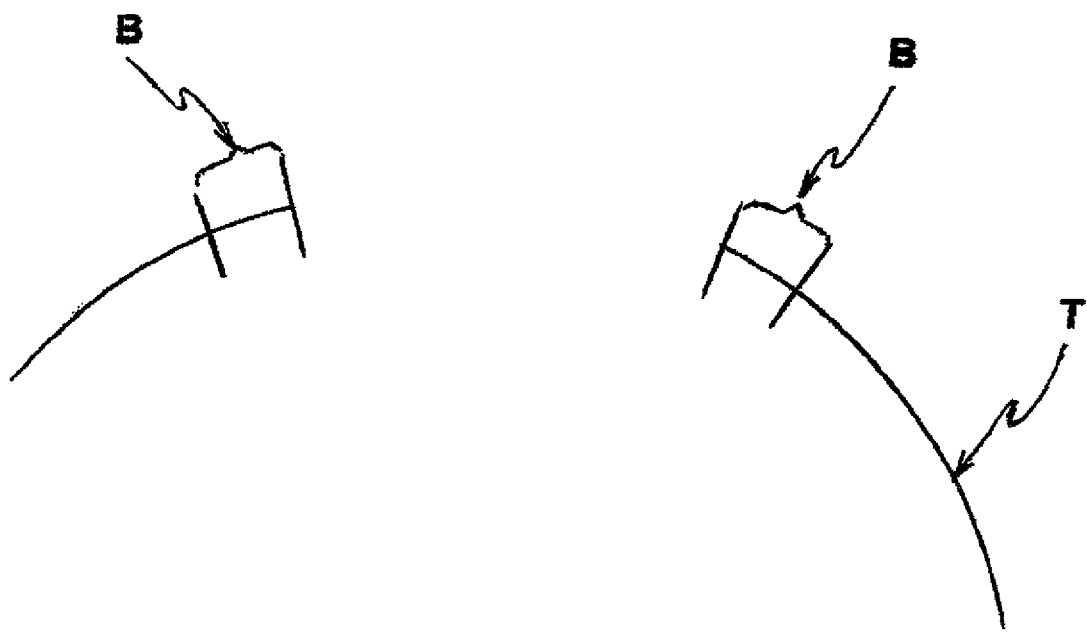
FIG. 20 is a schematic illustration showing a copied portion of a surface in another surface which can be used to approximate a surface region to fill where the area of interest was located.
Figure 21:
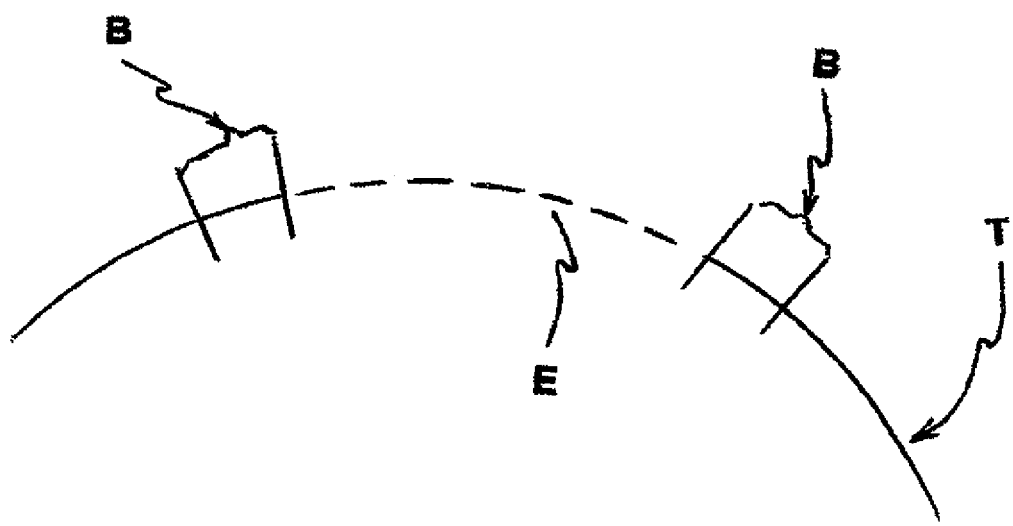
FIG. 21 is a schematic illustration showing a completed truth surface with an extrapolated surface region.
Figure 22:
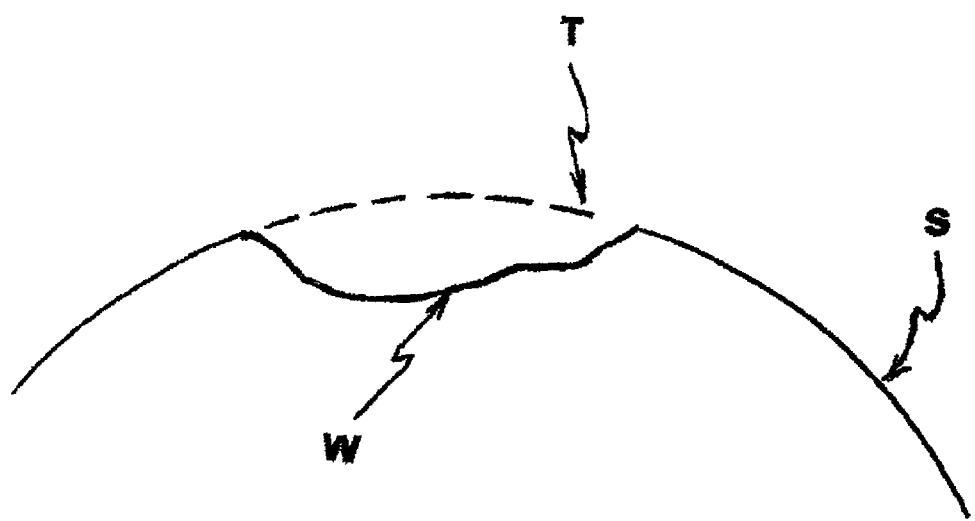
FIG. 22 is a schematic illustration showing the truth surface and another surface aligned and overlaid

Once the wound boundary is determined, a wound boundary region is then found (step 226). The wound boundary region is a region on surface S outside the surface of interest W (in this example the wound). The size of this boundary region can either be a fixed distance from the boundary B or its distance can be dynamically set based on the features of the area of interest W, boundary B, or surface S. FIG. 19 shows the boundary regions R for surface S with the area of interest (wound) W and boundary B. The portion of surface S not labeled, including the boundary region, can then be copied from surface S to a new truth surface T. FIG. 20 shows the copied portion of surface S in surface T. The boundary region B in surface T can then be used to approximate a surface region to fill where the surface of interest (wound) had previously been (step 228). Many different interpolation or approximation techniques can use the boundary region B to perform this task. One such technique is Radial Basis Functions (RBFs) which can use the boundary region B and the surface normals of B to fit a surface that can smoothly fill the region contained within the boundary region B. This extrapolated surface E can then be discretized, turned into a 3D mesh, and merged with the rest of surface T. FIG. 21 shows an illustration of the completed truth surface T with the extrapolated surface region E. By nature of how the truth surface T was created, surface T and surface S are already aligned by design. They can then each be overlaid as in FIG. 22 and comparisons can be made using the normal oriented distance ($D_N$) described above, or by other comparison methods (step 230). This enables accurate volume, cross sectional area, and depth measurements that was previous impossible.

It should now be obvious to one skilled in the art that this method for generating a truth surface also enables multiple surfaces to be compared relative to a truth surface created from one of the surfaces to be compared. This truth surface can then serve as a reference for all future comparisons.

Figure 5:
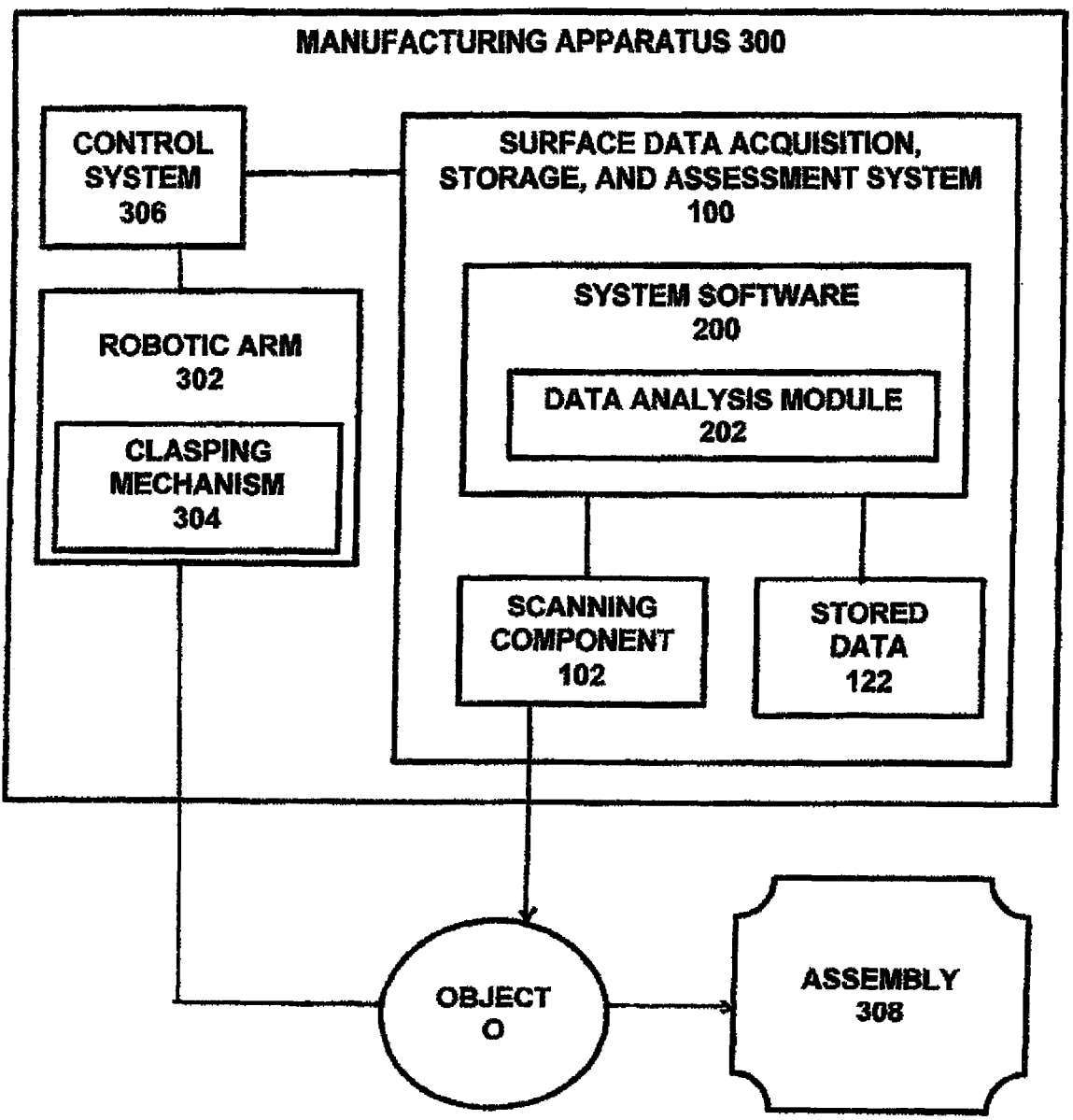
FIG. 5 is a schematic representation illustrating the general methodology of a manufacturing apparatus for performing a desired operation coupled to the surface data acquisition, storage, and assessment system of the subject application.

In another illustrated example of the process described above, is shown in FIG. 5, whereby a manufacturing apparatus 300, such as a robotic apparatus, for automatically performing a mechanical operation is in communication with or comprises the surface data acquisition, storage, and assessment system 100 of the subject application. In an illustrative example, an object O, such as an individual part (for example a screw, sprocket or other object) is to be installed in the manufacturing apparatus 300. A robotic arm 302 is shown having a clasping mechanism 304 effective for clasping the object O and placing it properly into the assembly 308. The scanning component 102 of the surface data acquisition, storage, and assessment system 100 operates to scan the object O and the data analysis module 202 of the system software 200 operates as described above to compare the collected scanned data 120 (scene image) with stored reference data 122 (reference image) to determine the alignment of the object O. The system software 200 then operates to communicate with the control system 306 of the manufacturing apparatus 300 providing instructional information to adjust the object into proper alignment such as for placement of the object into an assembly 308. The control system 306 and the data analysis module 202 function together such that that the robotic arm 302 and the clasping mechanism 304 properly performs the desired operation. It should be apparent that the surface data acquisition, storage, and assessment system 100 allows objects, such as parts, to be identified and the orientation of the object (as described below) to be analyzed so that the robotic operation can automatically be adjusted if necessary without the need to pause operations of the assembly.

Figure 6:
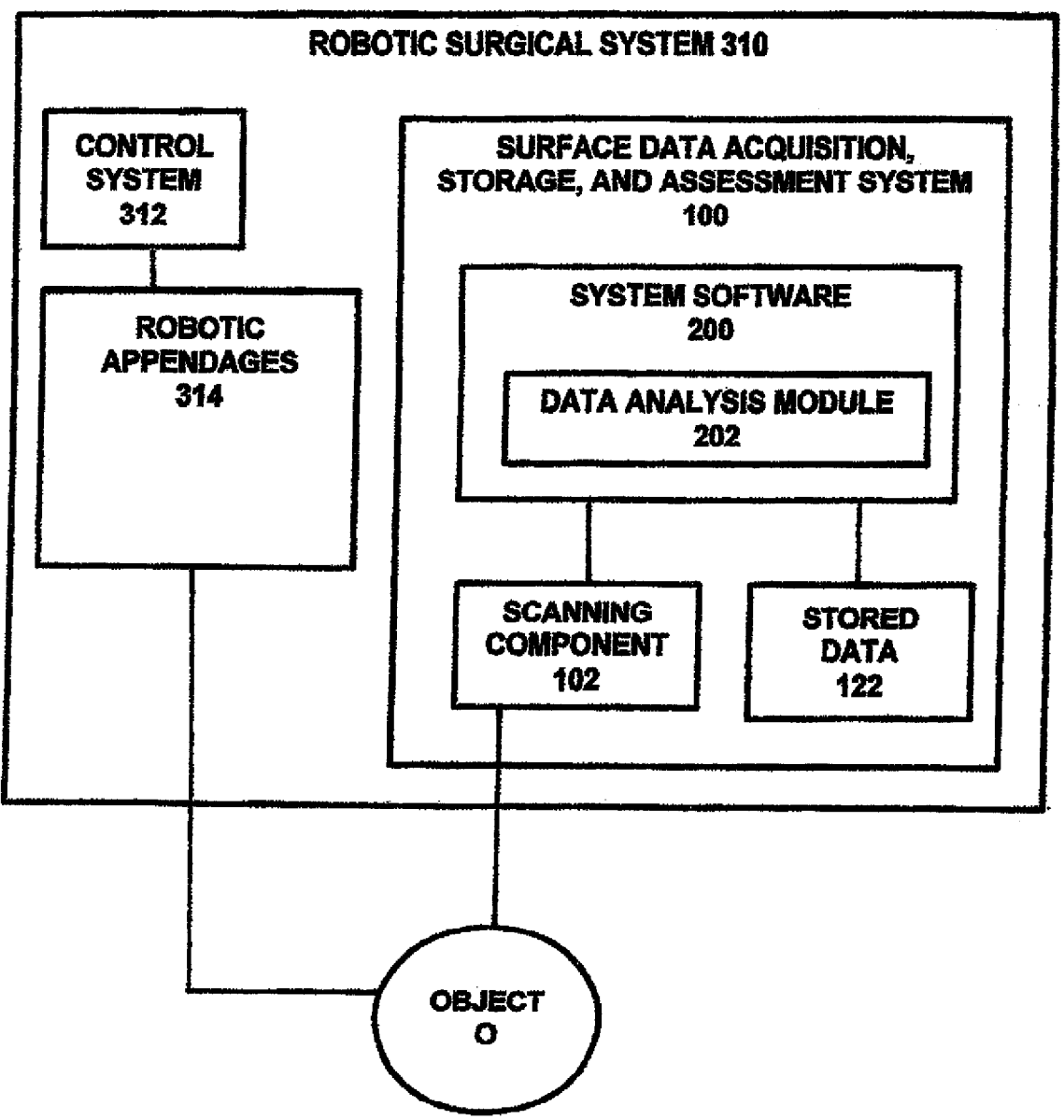
FIG. 6 is a schematic representation illustrating the general methodology of a robotic surgical system for performing a medical operation coupled to the surface data acquisition, storage, and assessment system of the subject application.

In another illustrative example is shown in FIG. 6, a robotic surgical system 410 comprises or is in communication with the surface data acquisition, storage, and assessment system 100 of the subject invention and includes a control system 312 for controlling one or more robotic appendages 314 that operate to perform a medical treatment operation such as surgery. The data analysis module 202 cooperates with the control system 312 of the robotic surgical system 310. The data analysis component 202 operates as described to compare reference stored image or data 122 of an object O, such as a part of a patient, with subsequent scene (scanned) images or data 120 and using the comparisons operates to calculate adjustments which are communicated to the control system 312 which directs the necessary adjustments to one or more of the robotic appendages 314. In another illustrative example, the system 100 operates such that the display device provides a notification for alerting a surgeon when the surgeon is in close proximity to biological landmarks or critical body parts, like the facial nerve for example. The data analysis component 202 operates as described to compare reference stored image or data 122 of and object O, such as a part of a patient, with subsequent scene (scanned) images or data 120. The reference stored image or data can be derived from CT, MRI, or other penetrative scanning technologies. Aligning surface scans performed during surgery then provides a reference to internal measurement available in the reference stored image. This enables the system to notify the surgeon whether they are in proximity to internal or external body parts of interest.

Figure 23:
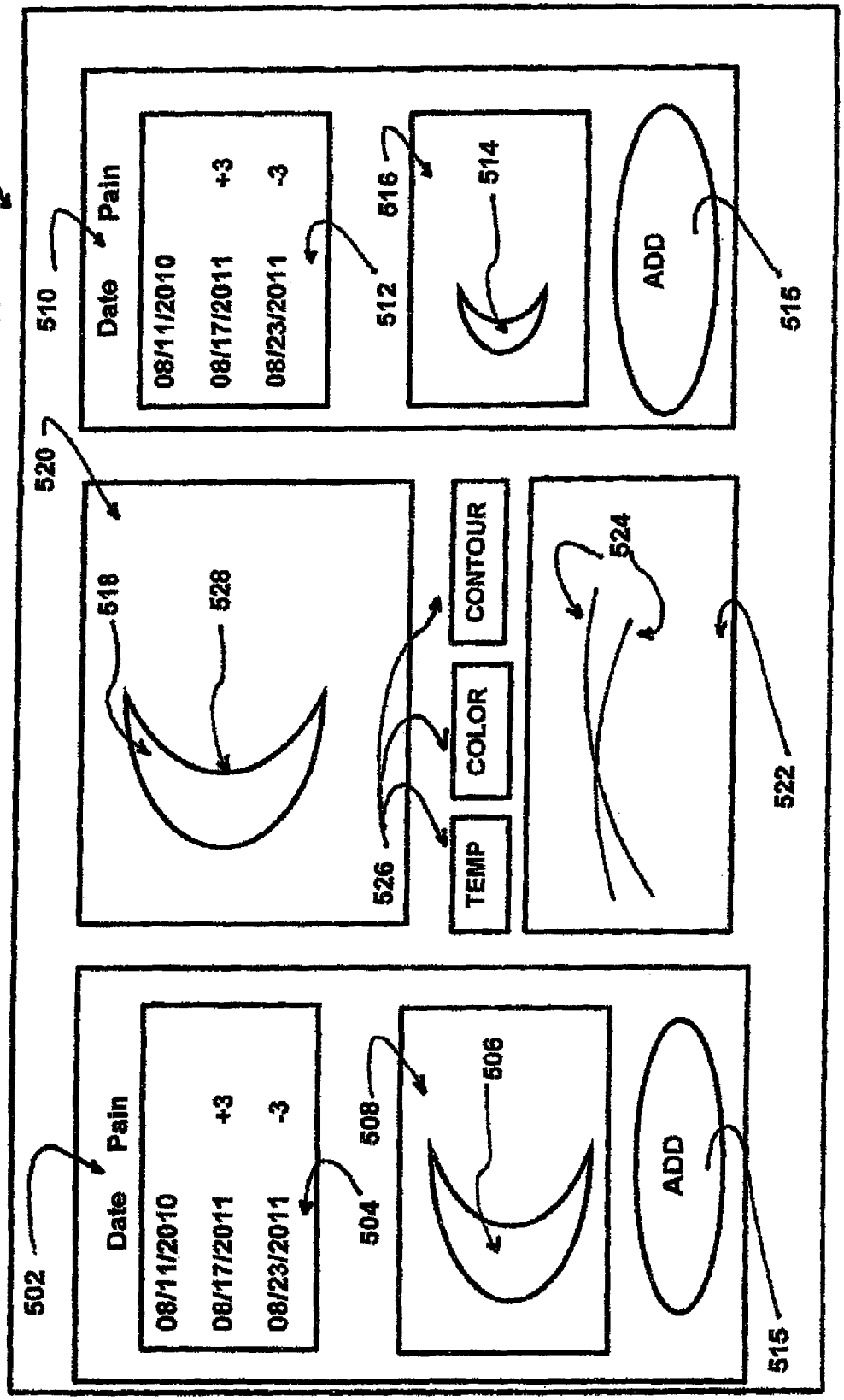
FIG. 23 is an exemplary illustration of a representative display generated by the system software showing a first scene (scanned) image being displayed by the surface data acquisition, storage, and assessment system and showing how an operator can navigate to various features of the system using various displayed fields.

Data Analysis Software Module (Displays):

Referring to FIGS. 23-28 a representative display page 500 generated by the system software 200 for displaying on an output device 112 is shown. Preferably, the display page 500 comprises a first image field 502 having a listing 504 that identifies previously scene (scanned) images whereby the user can select one of the identified listed scene (scanned) images which when selected the system software 200 operates to generate and display a first specific image 506 in a first display field 508. Referring to FIG. 23, a second image field 510 having a listing 512 that identifies previously scene (scanned) images (taken after the scan used to generate the first specific image 506) is shown whereby the user can select a second specific image 514 to be displayed and directs the system software 200 to operate and generate and display the second specific image 514 in a second display field 516. Once an image 506, 514 has been selected and displayed in the associated display field the system software operates by allowing the user, such as by utilizing a cursor, input keys, or other methods known in the art, to select an image 506, 514, such as by using the appropriate add field 515, and direct the system software to operate and allow the user to enlarge, rotate and/or translate in space the selected image 506, 514. The selected image is generated and displayed as a new image 518 in a third image field 520. It should now be apparent that the system software allows the user to view the object represented by the new image 518 at different angles and orientations. For an illustrated example, in a preferred embodiment a user can change the view to display an image allowing one to look down into the image (such as to "look inside" a cavity for example inside a wound along the skin of a patient). As shown a portion of the object can be displayed as the new image 518 or the object can be shown is a different orientation that that such as shown in the first image field 502 or in the second image field 510. Further, as shown the new image 518 can show an enlarged view of the object or a portion of the object.

The display page 500 is further provided with a measurement field 522. Preferably, as shown, the measurement field 522 is provided with a listing or a graphic illustration (as shown) of measurement parameters 524, such as contour, color, temperature, that when selected, by using the appropriate parameter field 526, operates to direct the system software 200 to generate and display the various images 506, 514, 518 such that they indicate the parameter selected. For example, the image generated can be a 3D image of the object that can show swelling or wound size, or a thermal image of the object, or the color of the object (which in the case of tissue can show redness). It should be understood that the user can switch back and forth between various images showing different parameters.

In a preferred embodiment of the invention the display page 500 as shown the user by selecting the add fields 515 for both images operates to allow the user to compare the first specific scene (scanned) image 506 with the second specific scene (scanned) image 514. By selecting the add fields 515 the system software 200 operates to superimpose the second specific scene (scanned) image 514, such as described above, as a transparent scan on top of the first specific scene (scanned) image 506 creating a comparison image as the new image 518 thereby allowing the user to see the actual differences between the two scans (images). In a preferred embodiment of the invention, the system software 200 operates such that the display page 500 can receive inputs, such as by way of a cursor, mouse, display pen, or other conventional means for allowing user allows the user to "click" on a selected point 528 on one of the scene images 506, 514, 528 which directs the system software 200 to display the requested measurement (contour (depth), temperature, color) for the selected point taken from each image, thereby allowing the user to see measurement changes at different points or locations from scan to scan. Preferably, as shown, the system software 200 operates to generate a graph or other representation 524 of the changes. For an example, for tissue wounds, changes such as wound depth, can be plotted showing whether the wound is getting deeper or shallower relative to an initial scan over time.

Figure 24:
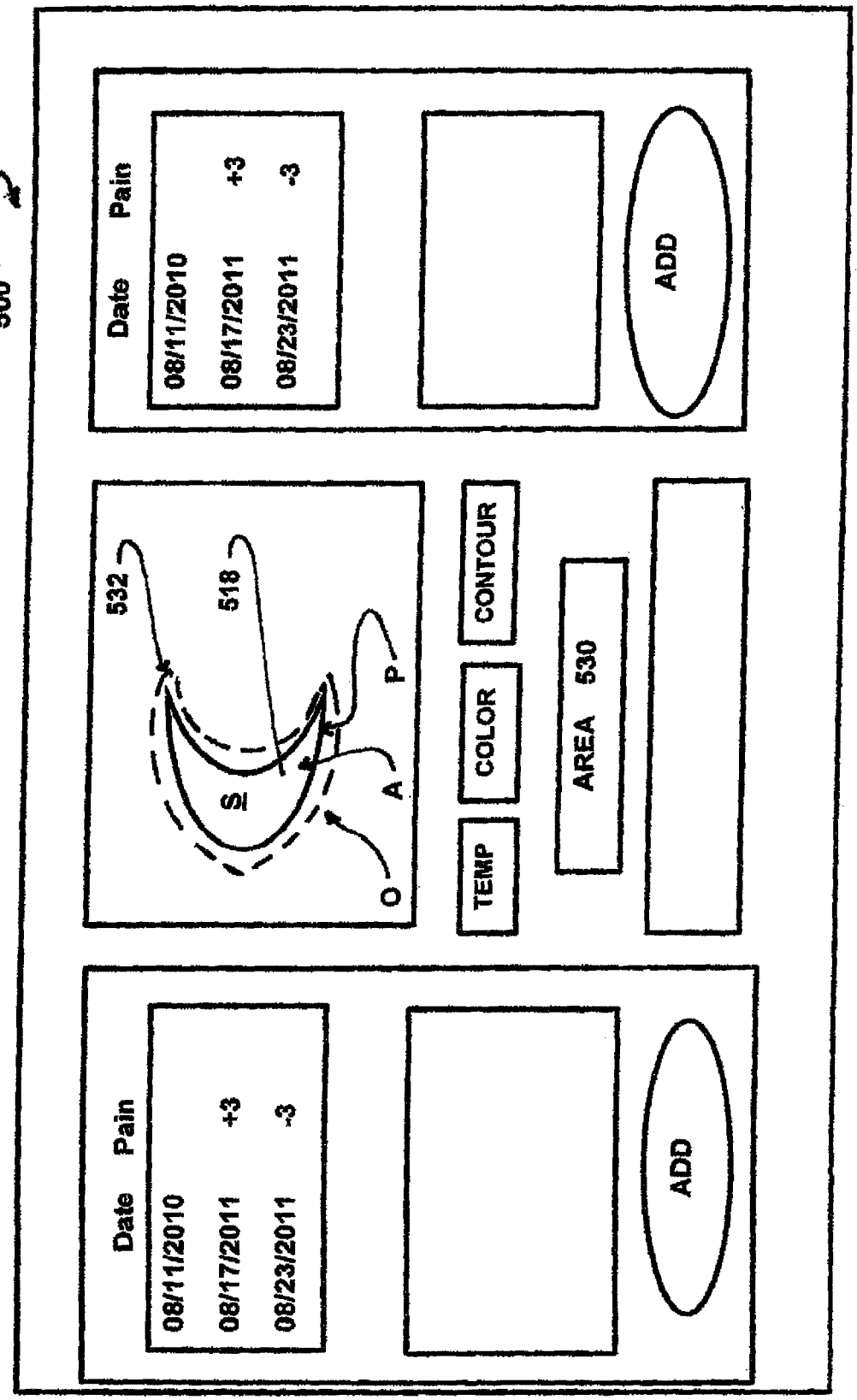
FIG. 24 is another exemplary illustration of a representative display generated by the system software showing a scene (scanned) image for allowing a user to draw a selected periphery around an area on the screen and the system software thereby generating and displaying the area within the selected periphery as well as displaying differences of areas that were selected for all other selected scans that can be used to determine if the areas are increasing or decreasing in size.

Referring to FIG. 24, another embodiment of the display page 500 is shown further comprising an area field 530. For example, in a preferred embodiment obtaining the surface area of a tissue wound may be desirable. The user by selecting the area field 530 directs the system software 200 to operate conventionally to allow the user to draw a boundary 532 around an image 518 or a portion of an image on the display such as by use of the user's finger, display pen, mouse, cursor or other such means. For an exemplary illustration, a user can identify the periphery P of the area of interest A along the surface S of the object O (tissue) and draws a boundary 532 around the periphery P. The system software 200 then operates to calculate the surface area within the periphery P and saves the calculated surface area in the data storage device 114 displays the calculated surface area. It should be understood that the subject invention is not limited to the various fields shown but fields may be subtracted or other fields added within the scope of the invention. Further, the particular arrangement of the display can be modified.

Figure 25:
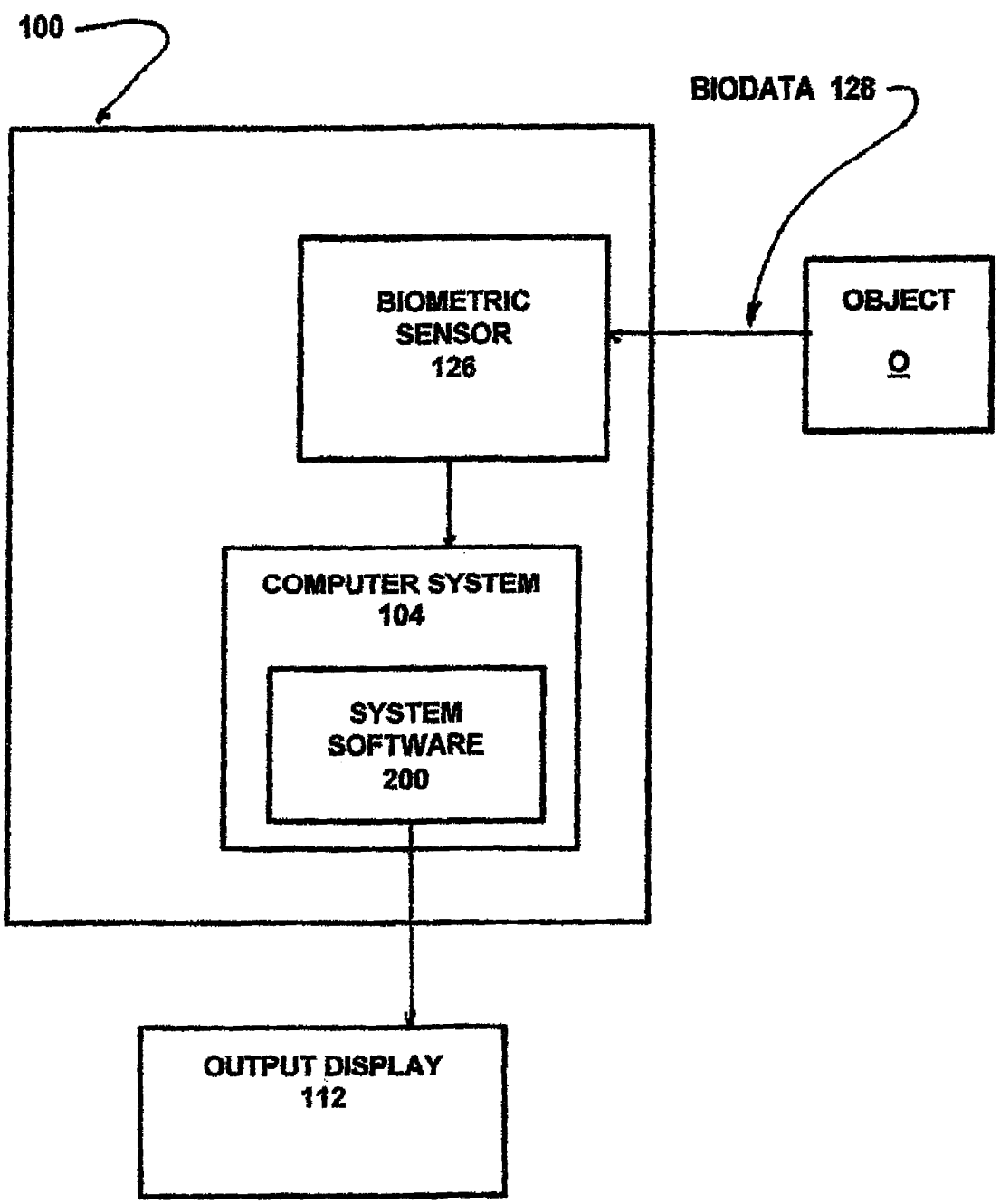
FIG. 25 is a schematic representation illustrating the general methodology of a preferred embodiment of the surface data acquisition, storage, and assessment system of FIG. 1 having a biometric sensor for identifying a user and automatically displaying an output that directly relates to the user.

In another embodiment of the invention, as shown in FIG. 25, the surface data acquisition, storage, and assessment system 100 further comprises a biometric sensor 126 that is coupled to the computer system 104. In a preferred embodiment of the invention the system software 200 operates such that input from the biometric sensor directs the software 200 to display certain requested data of an object O on the output device 112. As used herein the biometric sensor 126 is configured for analyzing biological attributes of a body and generating biodata 128 for authentication purposes. Biodata 128 includes data related to fingerprints, eye retinas and irises, voice patterns, facial patterns and hand measurements. In a preferred embodiment, the biometric sensor 126 is a fingerprint scanner that samples at least a portion of a fingertip or other body part of a patient thereby providing biodata 128 (e.g. fingerprints, thumbprints, palm prints, footprints). One exemplary illustration of the biometric sensor 126 is shown configured to transfer biodata 128 to the computer system 102. A user initiates the system whereby the system software 200 operates to request the user to use the biometric sensor 126 to transfer biodata 128 to the computer system 102. If the user authorization is confirmed, the system software 200 operates to transfer user information to be displayed on the output device 112. In a preferred embodiment the user information includes the user's medical history. In another preferred embodiment the information includes the last scans taken of the user for a particular condition or an object at a particular time. In another preferred embodiment, the system operates that more than one user is required to authorize use of the system. For example, in the medical field the system may require the treating physician as well as the patient to use the biometric sensor. It should now be apparent to one skilled in the art that the use of the biosensor allows increased security of the system as well reducing the amount of time to obtain data histories (such as for example medical files or past scans), and ensuring to a greater extent that the proper information is retrieved.

The surface data acquisition, storage, and assessment system of the subject invention operates to detect and quantify similarities or differences between collected data obtained from an object of interest and stored reference data and which can operate in a relative short amount of time and preferably in relative real time. The system operates utilizing a method or process that decreases the time required for calculating a pose estimate such as by the use of a spin-image algorithm, thus increasing its performance thereby making it more practical for many applications that require real-time operations. In a preferred embodiment of the invention the system comprises one or more sensing components for scanning and measuring various surface features of an object, including one or more of the following: color, temperature, texture, size, shape, spatial dimensions, contour, curvature, softness, roughness, shininess/gloss, infrared signature, electrical vectors/flux, magnetic field strength/vector/flux, dynamic rebound, flexibility, spatial phase characteristics, measurements derived from spatial phase characteristics, and other such features. Preferably the system comprises a data analysis component having software and/or firmware capable of comparing data retrieved from the object scanned to a reference database or other representation comprising data from other similar or dissimilar objects or from a previous scan of the object. In another preferred embodiment of the invention the data analysis component comprises system software that operates to determine the identity of the scanned object by comparing the data from scanned object to various stored data. In a preferred embodiment, the surface data acquisition, storage, and assessment system of the subject invention further operates to determine differences between data obtained from two or more scans of the object.

In another preferred embodiment of the invention the data analysis component comprises software and/or firmware capable of comparing the data retrieved from the scanned object to a database or other representation comprising data from other similar or dissimilar objects and is capable of detecting and quantifying the similarities or differences between collected data from the scanned object and stored data. It should now be apparent to one skilled in the art that such a system permits the identification of a scanned object by comparing the data from the scanned object to various reference stored data. The system software performs the method of representing the local topography of the object as a 2D histogram that is invariant to rigid transformations and creates model spin-images for the generation of plausible scanned-model point correspondence for use to generate pose estimates. Thus, it should now be apparent that two or more scans, such as scans showing dimensions, color, temperature, and the like, can be placed in overlapping position using pose estimation allowing an image that shows changes to such parameters. This can be done in real time (less than about 1 minute). It should also now be apparent to one skilled in the art that the subject invention can operate to scan numerous objects including, but not limited to mechanical objects, biological objects or medical conditions, artifacts, geographical objects, agricultural objects, or used in conjunction with robotic manufacturing systems, robotic surgical systems, aircraft systems, and marine applications.

The surface data acquisition, storage, and assessment system of the subject invention provides a structured methodology and design utilized by the system software and is not limited solely to the specific design of the software. Although the foregoing invention has been described in some detail for purposes of clarity of understandings, it will be apparent that certain changes and modifications may be practiced within the scope of the appended claims. It should now be apparent that the various embodiments presented can be easily modified while keeping within the scope and spirit of the subject invention. Accordingly, it should be understood that the present disclosure is to be considered as exemplary of the principals of the invention and is not intended to limit the invention to the embodiments and the specific examples illustrated and the invention is not to be limited to the details given herein, but may be modified within the scope and equivalents of the descriptions and examples contained herein.

The invention claimed is:

1. A surface data acquisition, storage, and assessment system for detecting and quantifying similarities or differences between a first scan image and a reference image for use in analyzing certain features of a surface of an object, said system comprising:

one or more scanning components having one or more scanning devices selected from the list consisting of thermal, infrared, laser, optical, color, mechanical, biometric and sound scanning devices that operates to take a first scan of at least a portion of the surface of the object and directly obtains first scanned measurements at a plurality of points of two or more features of the object along the at least a portion of the surface of the object and wherein said first scan and first scanned measurements are stored in a data storage device wherein at least one of the features is selected from a list of features comprising color, temperature, dimensions, spatial dimensions, shininess/gloss, dynamic rebound, flexibility and infrared signature;

a data analysis software module operates to create for each of the two or more features at least one first scanned image of the at least a portion of the scanned surface of the object using said first scan and said first scanned measurements for one of the two or more features;

wherein said data storage device includes at least one reference image of the two or more features of the object along the at least a portion of the surface of the object and wherein said at least one reference image includes reference measurements for the one or two features;

wherein said data analysis software module further operates to determine same surface points along the at least a portion of the object in each said first scanned image and each reference image and uses said same surface points to align each said first scanned image with each said reference image and wherein said data analysis software operates such that when an operator selects a surface point on one said first scanned image or one said reference image for one of the two or more features, said data analysis software module operates to determine difference in said first scanned measurements and said reference measurements of a selected feature between said selected surface point of said first scan image and said reference image;

wherein said data analysis software module further operates to make a recommendation or a determination with respect to the object, wherein said recommendation or said determination is based on a weight assigned to one or more parameters for the object and a condition of the object for each of the two or more features based on the significance of said one or more parameters in relation to the object and a condition being assessed and uses said differences in said first scanned measurements and said reference measurements and said weighted one or more parameters to make a recommendation or determination relating to the object or a condition of the object or if action should be taken with respect to the object and displays said recommendation or determination on an output device.

2. The surface data acquisition, storage, and assessment system of claim 1 wherein said data analysis software module operates to display one said first scanned image showing one feature and one said reference image showing the same one feature and wherein said at least a portion of the surface of the object of said one said reference image is superimposed over said at least a portion of the surface of the object of said one said first scanned image such that the at least a portion of the surface of the object of said one said reference image and the at least a portion of the surface of the object of said one said first scan image are aligned creating a comparison image wherein said comparison image that displays differences between said first scan measurements and said reference measurements of the one feature.

3. The surface data acquisition, storage, and assessment system of claim 1 wherein said data analysis software module operates to display on an output device said first scanned image and said reference image and further operates to display a comparison image showing point to point differences between said first scanned measurements and said reference measurements of the one feature.

4. The surface data acquisition, storage, and assessment system of claim 1 wherein said assigned weight is based on significance of each of said parameters in relation to the object and a condition being assessed and further operates to use said first scanned measurements and said reference measurements for each weighted parameter to make said recommendation using fuzzy logic for the condition or operation of the object.

5. The surface data acquisition, storage, and assessment system of claim 1 wherein said list of scanning devices further comprises visible light cameras, infrared cameras, infrared detectors, ultraviolet cameras, ultraviolet detectors, radio wave detectors, microwave detectors, structured light detectors, glossmeters, colorimeters, microphones, calipers, sensing wire probes, laser measuring devices, and strain gages.

6. The surface data acquisition, storage, and assessment system of claim 1 wherein said recommendation identifies the object.

7. The surface data acquisition, storage, and assessment system of claim 1 wherein said first scan image and said reference image were taken at different times.

8. The surface data acquisition, storage, and assessment system of claim 1 wherein the object is a mechanical object performing a mechanical operation.

9. The surface data acquisition, storage, and assessment system of claim 1 wherein the object is a biological object.

10. The surface data acquisition, storage, and assessment system of claim 1 wherein the object is a medical condition.

11. The surface data acquisition, storage, and assessment system of claim 1 wherein the object is an artifact, a geographical object, or an agricultural object.

12. The surface data acquisition, storage, and assessment system of claim 1 wherein said system operates in conjunction with a robotic manufacturing system such that said recommendation operates to modify the operation of the robotic manufacturing system.

13. The surface data acquisition, storage, and assessment system of claim 1 wherein said recommendation identifies the likely creator of the object or authenticates the creator of the object.

14. The surface data acquisition, storage, and assessment system of claim 1 wherein said recommendation identifies one or more of said first measurements of one or more feature that is outside allowable tolerances.

15. The surface data acquisition, storage, and assessment system of claim 1 wherein said recommendation operates to direct a mechanical operation to place the object in proper orientation for an assembly.

16. A surface data acquisition, storage, and assessment system for analyzing certain features along a surface of an object, said system comprising:
  one or more scanning components having one or more scanning devices that operates to take a scan of at least a portion of the surface of the object and uses said one or more scanning devices to directly take one or more scanned measurements of two or more features of the object at a plurality of points along the surface of the object and stores said scanned measurements in a database wherein the features are selected from the list consisting of color, temperature, dimensions, spatial dimensions, shininess/gloss, and infrared signature; and
  a data analysis software module operates to use said scan and said scanned measurements to create and display a scanned image showing one feature of the one or more features and said scanned measurements of the one feature at said plurality of points along the surface of the object and wherein said data analysis software module further operates to align said plurality of points of said scanned image with a plurality of points of a reference image stored in a database having reference measurements of the one feature at said plurality of points and determines differences between said scanned measurements of the one feature and said reference measurements at the same said plurality of points for the one feature and creates and displays a comparison image showing said differences between said scanned measurements and said reference measurements at said same said plurality of points for the one feature;
  wherein said data analysis software module further operates such that when an operator selects a point on said scanned image, a scanned measurement for said selected point is displayed and when a selected point is selected on said comparison image, said difference between said scanned measurement and said reference measurement for said selected point is displayed.

17. The surface data acquisition, storage, and assessment system of claim 16 wherein said data analysis software module uses said measurements of one or more features and applies a normalized measure to said feature and uses fuzzy logic to make a recommendation as to the object.

18. The surface data acquisition, storage, and assessment system of claim 16 wherein said recommendation assesses a medical condition.

19. The surface data acquisition, storage, and assessment system of claim 16 wherein said recommendation assesses a manufacturing operation.

20. The surface data acquisition, storage, and assessment system of claim 16 wherein said scanned image is a three dimensional image of the surface showing one feature of the surface and said scanned measurements of the one feature and wherein said reference image is a three dimensional image showing said reference measurements and wherein said comparison image is a three dimensional image showing differences in said scanned measurements and said reference measurements at said same surface points of the one feature and said data analysis software module further operates to make a recommendation using said comparison image.

21. A surface data acquisition, storage, and assessment system for detecting and quantifying similarities or differences between a first scan and a second scan for use by an operator in analyzing certain features of a surface an object, said system comprising:
- a scanning component having at least one scanning device selected from the list consisting of thermal, infrared, laser, optical, color, and mechanical scanning devices that operates to take a first scan of the surface of the object and directly obtains first scanned measurements at a plurality of points of a feature of the object and wherein the feature is selected from the list consisting of color, temperature, dimensions, and spatial dimensions;
- a scanning component having at least one scanning device selected from the list consisting of thermal, infrared, laser, optical, color and mechanical scanning devices that operates to take a second scan of the surface of the object and directly obtains second scanned measurements at a plurality of points of the feature of the object, and
- a data analysis software module operates to use said first scan and said first scanned measurements to create a first scanned image of a selected feature that illustrates measurements of the selected feature along the surface of the object and further operates to use said second scan and said second scanned measurements to create a second scanned image of the selected feature that illustrates measurements of the selected feature along the surface of the object;
- wherein said data analysis software module further operates to determine same surface points along the at least a portion of the object in said first scanned image and said second scanned image and aligns said first scanned image with said second scanned image such that said plurality of points of said first scan image aligns with said plurality of points of said second scanned image;
- wherein said data analysis software module further operates to create and displays a comparison image of a feature using said aligned first scanned image and said second scanned image, wherein said comparison image illustrates differences between said measurements of said first scanned image and said measurements of said second scanned image; and
- wherein said data analysis module further operates such that when the operator selects a point on said first scanned image of a feature said data analysis module then operates to use said first scanned image and said first scanned measurements to display a first measurement for said selected point on said first scanned image or an operator can select a point on said second scanned image of a feature and said data analysis module then operates to use said second scanned image and said second scanned measurements to display a second measurement for said selected point and further operates to use said first scanned measurements and said second scanned measurements to determine a difference in measurements between said first measurement and said second measurement for said selected point and operates to display said difference in measurements for said selected point on said comparison image.

* * * * *